(12) United States Patent
Ono

(10) Patent No.: US 11,012,607 B2
(45) Date of Patent: May 18, 2021

(54) IMAGING APPARATUS AND IMAGE COMPOSITION APPARATUS

(71) Applicant: FUJIFILM Corporation, Tokyo (JP)

(72) Inventor: Shuji Ono, Tokyo (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 16/601,589

(22) Filed: Oct. 15, 2019

(65) Prior Publication Data

US 2020/0045235 A1  Feb. 6, 2020

Related U.S. Application Data

(63) Continuation of application No. PCT/JP2018/017659, filed on May 7, 2018.

(30) Foreign Application Priority Data

May 16, 2017  (JP) .............................. JP2017-097595

(51) Int. Cl.
| | | |
|---|---|---|
| *H04N 5/232* | (2006.01) | |
| *B64C 39/02* | (2006.01) | |
| *G03B 13/22* | (2021.01) | |
| *G03B 13/32* | (2021.01) | |
| *G03B 15/00* | (2021.01) | |

(Continued)

(52) U.S. Cl.
CPC ..... *H04N 5/232121* (2018.08); *B64C 39/024* (2013.01); *G03B 13/22* (2013.01); *H04N 5/232127* (2018.08); *B64C 2201/123* (2013.01); *B64C 2201/127* (2013.01)

(58) Field of Classification Search
CPC ........ H04N 5/232121; H04N 5/232127; B64C 39/024; G03B 15/006
See application file for complete search history.

(56) References Cited

U.S. PATENT DOCUMENTS

| | | |
|---|---|---|
| 7,761,257 B2 | 7/2010 | Matsuzawa |
| 9,451,153 B2 | 9/2016 | Kikuchi et al. |

(Continued)

FOREIGN PATENT DOCUMENTS

| | | |
|---|---|---|
| CN | 101303269 | 11/2008 |
| CN | 104081244 | 10/2014 |

(Continued)

OTHER PUBLICATIONS

"International Search Report (Form PCT/ISA/210) of PCT/JP2018/017659", dated Jul. 24, 2018, with English translation thereof, pp. 1-9.

(Continued)

*Primary Examiner* — Christopher K Peterson
(74) *Attorney, Agent, or Firm* — JCIPRNET

(57) ABSTRACT

An imaging apparatus capable of capturing an in-focus image while moving, and an image composition apparatus capable of generating a high detail composite image are provided. A camera 100 is mounted on an unmanned aerial vehicle 10, and imaging is performed while moving. During imaging, a focusing mechanism included in the camera 100 is controlled, and a focus position is periodically scanned. In addition, during imaging, movement of the unmanned aerial vehicle 10 is controlled such that at least one scanning is performed during movement to a position shifted by an imaging range.

19 Claims, 29 Drawing Sheets

(51) Int. Cl.
*B64D 47/08* (2006.01)
*G02B 7/08* (2021.01)

(56) References Cited

U.S. PATENT DOCUMENTS

| | | | |
|---|---|---|---|
| 10,798,286 B2* | 10/2020 | Yu | G03B 15/006 |
| 2008/0259162 A1* | 10/2008 | Aoki | G06K 9/32 |
| | | | 348/159 |
| 2011/0273471 A1 | 11/2011 | Nagasaka et al. | |
| 2012/0262595 A1 | 10/2012 | Kishida et al. | |
| 2015/0247988 A1 | 9/2015 | Kishida et al. | |
| 2016/0048945 A1 | 2/2016 | Chihara et al. | |
| 2016/0080648 A1* | 3/2016 | Iguchi | H04N 5/232133 |
| | | | 348/222.1 |
| 2016/0323504 A1* | 11/2016 | Ono | H04N 5/2251 |
| 2017/0205826 A1* | 7/2017 | Smith | B64C 39/024 |
| 2018/0191938 A1* | 7/2018 | Pena De Sousa Santos | |
| | | | G06K 9/00134 |

FOREIGN PATENT DOCUMENTS

| | | |
|---|---|---|
| CN | 105960796 | 9/2016 |
| CN | 206095970 | 4/2017 |
| JP | H1031151 | 2/1998 |
| JP | 2010166519 | 7/2010 |
| JP | 2011242791 | 12/2011 |
| JP | 2013162185 | 8/2013 |
| JP | 2015154386 | 8/2015 |
| JP | 2016039390 | 3/2016 |
| JP | 2016063262 | 4/2016 |
| JP | 2016194783 | 11/2016 |

OTHER PUBLICATIONS

"Written Opinion of the International Searching Authority (Form PCT/ISA/237) of PCT/JP2018/017659", dated Jul. 24, 2018, with English translation thereof, pp. 1-23.

Office Action of China Counterpart Application, with English translation thereof, dated Aug. 18, 2020, pp. 1-22.

* cited by examiner

IMAGING APPARATUS AND IMAGE COMPOSITION APPARATUS

CROSS-REFERENCE TO RELATED APPLICATIONS

This application is a Continuation of PCT International Application No. PCT/JP2018/017659 filed on May 7, 2018, which claims priority under 35 U.S.C § 119(a) to Japanese Patent Application No. 2017-097595 filed on May 16, 2017. Each of the above application(s) is hereby expressly incorporated by reference, in its entirety, into the present application.

BACKGROUND OF THE INVENTION

1. Field of the Invention

The present invention relates to an imaging apparatus and an image composition apparatus and particularly, to an imaging apparatus performing imaging while moving, and an image composition apparatus generating one composite image from an image captured by the imaging apparatus.

2. Description of the Related Art

A technology (referred to as mosaic composition, stitching, and the like) for continuously imaging the ground using a camera mounted on an aerial vehicle and generating one composite image in which a wide range is captured by linking an acquired image group is known (for example, JP2016-039390A and the like). This kind of technology is also known as a technology for generating a panorama image.

It is necessary to capture individual linked images in an in-focus state in order to generate a high detail composite image using such a kind of technology. In addition, it is necessary to perform imaging using a telephoto lens in order to generate a higher detail composite image.

However, it is difficult to accurately operate autofocus in performing imaging while moving. Particularly, a camera using the telephoto lens has a shallow depth of field. Thus, it is difficult to accurately operate the autofocus in performing imaging while moving.

JP1998-031151A (JP-H10-031151A) suggests a method of adjusting the depth of field depending on a subject distance as a method of accurately operating the autofocus in performing imaging while moving.

SUMMARY OF THE INVENTION

However, a range in which the depth of field can be adjusted is limited. Particularly, the camera using the telephoto lens also has a shallow depth of field that can be adjusted. Thus, a disadvantage that a case where the subject distance significantly varies cannot be handled is present.

The present invention is conceived in view of such matters. An object of the present invention is to provide an imaging apparatus capable of capturing an in-focus image while moving, and an image composition apparatus capable of generating a high detail composite image.

Means for Solving the Object is as Follows (1) An imaging apparatus comprising a moving object, an imaging part included in the moving object, a focusing mechanism included in the imaging part, a focusing control part that periodically scans a focus position by controlling the focusing mechanism, a movement control part that moves the moving object at a speed at which at least one scanning is performed during movement to a position shifted by an imaging range, an imaging control part that causes the imaging part to continuously capture a motion image or periodically capture a still image, and a recording part in which a motion image or a still image group captured by the imaging part is recorded.

According to the present aspect, the motion image is continuously captured, or the still image is periodically captured while moving by the moving object. Continuous capturing of the motion image is continuous capturing of the motion image from the start of imaging until the end of imaging. Periodic capturing of the still image is repeated capturing of the still image at a constant interval from the start of imaging until the end of imaging. During imaging, the focusing mechanism is controlled by the focusing control part, and the focus position is periodically scanned. The "scanning" of the focus position refers to an operation of displacing the focus position from one end to another end within a predetermined range. For example, the "scanning" refers to an operation of displacing the focus position from the position of a closest end to the position of an infinite end. The "periodic scanning" refers to repeated execution of scanning in a constant cycle. By periodically scanning the focus position, images having different in-focus positions in each frame can be captured in the case of capturing the motion image. In the case of capturing the still image, still images having different in-focus positions in each capturing can be captured. The captured motion image or still image group is recorded in the recording part. In a case where the recorded motion image or still image group is analyzed in units of scanning, and an image of a frame having the highest sharpness or a still image having the highest sharpness is extracted, an in-focus image is acquired in units of scanning. The movement speed of the moving object is controlled such that at least one scanning is performed during movement to the position shifted by the imaging range. Accordingly, even in the case of performing imaging while moving, an in-focus image can be securely captured. That is, an image that has a certain overlapping part and is in focus can be captured.

(2) The imaging apparatus of (1), in which the movement control part moves the moving object at a speed at which one scanning is completed at the same time as the movement to the position shifted by the imaging range.

According to the present aspect, the moving object moves at the speed at which one scanning is completed at the same time as the movement to the position shifted by the imaging range. Accordingly, imaging can be efficiently performed. The "same time" does not require strict simultaneity and includes a range that is regarded as being almost the same time. Accordingly, a slight deviation is allowed. Thus, the moving object may move at a speed at which one scanning is completed at almost the same timing as the movement to the position shifted by the imaging range.

(3) The imaging apparatus of (1) or (2), further comprising an imaging range calculation part that calculates the imaging range based on a subject distance and an angle of view of the imaging part.

According to the present aspect, the imaging range is calculated based on the subject distance and the angle of view of the imaging part. Accordingly, the imaging range can be automatically set.

(4) The imaging apparatus of (3), further comprising a subject distance detection part that detects the subject distance based on an output of the imaging part.

According to the present aspect, the subject distance is detected based on the output of the imaging part. Accordingly, even in a case where the subject distance varies, the current imaging range can be estimated. The movement control part adjusts the speed of the moving object depending on the variation of the imaging range.

(5) The imaging apparatus of any one of (1) to (4), in which the imaging part includes an imaging lens and an image sensor that captures an image formed in the imaging lens, and the focusing mechanism displaces the focus position by moving a part or all of lens groups constituting the imaging lens.

According to the present aspect, the imaging part is configured to comprise the imaging lens and the image sensor that captures the image formed in the imaging lens. The focusing mechanism displaces the focus position by moving a part or all of the lens groups constituting the imaging lens.

(6) The imaging apparatus of any one of (1) to (5), in which the focusing control part periodically scans the focus position by displacing the focus position in a sine wave shape.

According to the present aspect, the focus position is periodically scanned by displacing the focus position in the sine wave shape. In this case, scanning is performed in both of a forward path and a rearward path.

(7) The imaging apparatus of any one of (1) to (5), in which the focusing control part periodically scans the focus position by displacing the focus position in a sawtooth wave shape.

According to the present aspect, the focus position is periodically scanned by displacing the focus position in the sawtooth wave shape. In this case, scanning is performed in only the forward path.

(8) The imaging apparatus of any one of (1) to (7), further comprising an in-focus image extraction part that analyzes the motion image or the still image group recorded in the recording part in units of scanning and extracts an image of a frame having the highest sharpness or a still image having the highest sharpness as an in-focus image.

According to the present aspect, the in-focus image extraction part that extracts the in-focus image is comprised. The in-focus image extraction part analyzes the motion image or the still image group recorded in the recording part in units of scanning and extracts the image of the frame having the highest sharpness or the still image having the highest sharpness as the in-focus image.

(9) The imaging apparatus of (5), in which the imaging lens includes a first optical system and a second optical system that has the same optical axis as the first optical system and has a shorter focal length than the first optical system, the image sensor has pixels that selectively receive light passing through the first optical system and light passing through the second optical system and are regularly arranged, and captures an image formed in the first optical system and an image formed in the second optical system at the same time, the focusing mechanism includes a first optical system focusing mechanism that displaces a focus position of the first optical system by moving a part or all of lens groups constituting the first optical system, the focusing control part includes a first optical system focusing control part that periodically scans the focus position of the first optical system by controlling the first optical system focusing mechanism, the movement control part moves the moving object at a speed at which at least one scanning is performed during movement to a position shifted by an imaging range of the first optical system, the imaging control part causes the image sensor to continuously capture a motion image or periodically capture a still image, and the recording part records a motion image or a still image group captured by the first optical system and the motion image or the still image group captured by the second optical system.

According to the present aspect, images having different focal lengths can be captured at the same time on the same axis. Specifically, the imaging lens is configured to comprise two optical systems (the first optical system and the second optical system) having different focal lengths, and the image sensor is configured to be capable of capturing an image formed in each optical system at the same time. The two optical systems (the first optical system and the second optical system) have the same optical axis, and the second optical system has a shorter focal length than the first optical system. The image sensor is configured by regularly arranging the pixels that selectively receive light passing through the first optical system and light passing through the second optical system, and captures the image formed in the first optical system and the image formed in the second optical system at the same time. That is, the image of the first optical system is captured by a pixel group receiving light passing through the first optical system, and the image of the second optical system is captured by a pixel group receiving light passing through the second optical system. Accordingly, images having different focal lengths can be captured at the same time on the same axis by one imaging part, and images not having parallax can be captured. A focusing mechanism (first optical system focusing mechanism) of the first optical system is comprised as the focusing mechanism. The first optical system focusing mechanism displaces the focus position of the first optical system by moving a part or all of the lens groups constituting the first optical system. The first optical system focusing control part is comprised as the focusing control part. The first optical system focusing control part periodically scans the focus position of the first optical system by controlling the first optical system focusing mechanism. Accordingly, in the first optical system, images having different in-focus positions are captured. That is, in the case of capturing the motion image, images having different in-focus positions in each frame are captured. In the case of capturing the still image, still images having different in-focus positions in each scanning are captured. The motion image or the still image group captured by the first optical system and the motion image or the still image group captured by the second optical system are recorded in the recording part. In a case where the motion image or the still image group captured by the first optical system is analyzed in units of scanning, and the image of the frame having the highest sharpness or the still image having the highest sharpness is extracted, the in-focus image is acquired in units of scanning. The movement speed of the moving object is controlled such that at least one scanning is performed during movement to the position shifted by the imaging range of the first optical system. Accordingly, even in the case of performing imaging while moving, an in-focus image can be securely captured in the first optical system. That is, an image that has a certain overlapping part and is in focus can be captured. For the motion image or the still image group captured by the second optical system, an image corresponding to the extracted in-focus image may be extracted. That is, an image that is captured at the same timing as the image extracted as the in-focus image may be extracted. In the case of generating a composite image of a wide range by a process such as mosaic composition, a process such as feature point extraction is performed using the image captured by the second optical system. The image captured by the second optical system is an image in which a wider range than the image captured by the first optical system is captured. Thus, more feature points can be extracted. The composite image is generated using an in-focus image group captured by the first optical system. The image captured by the first optical system is a more telephoto image than the image captured by the second optical system. Thus, a composite image having a higher resolution can be generated.

(10) The imaging apparatus of (9), in which the second optical system is a fixed focal point optical system and performs pan-focus imaging.

According to the present aspect, the second optical system is the fixed focal point optical system and performs pan-focus imaging. The second optical system can be configured with a lens having a short focal length. Thus, pan-focus imaging can be performed.

(11) The imaging apparatus of (9), further comprising a second optical system in-focus state detection part that detects an in-focus state of the second optical system, in which the focusing mechanism further includes a second optical system focusing mechanism that displaces a focus position of the second optical system by moving a part or all of lens groups constituting the second optical system, and the focusing control part further includes a second optical system focusing control part that controls the second optical system focusing mechanism and causes the second optical system to focus on a subject based on a detection result of the second optical system in-focus state detection part.

According to the present aspect, the second optical system in-focus state detection part that detects the in-focus state of the second optical system, a focusing mechanism (second optical system focusing mechanism) of the second optical system, and a control part (second optical system focusing control part) of the focusing mechanism of the second optical system are comprised. The second optical system focusing mechanism displaces the focus position of the second optical system by moving a part or all of the lens groups constituting the second optical system. The second optical system focusing control part controls the second optical system focusing mechanism and causes the second optical system to focus on the subject based on the detection result of the second optical system in-focus state detection part. Accordingly, in the second optical system, the in-focus image can be accurately captured.

(12) The imaging apparatus of any one of (9) to (11), in which in the imaging lens, the first optical system and the second optical system are arranged in a concentric shape.

According to the present aspect, the first optical system and the second optical system are arranged in the concentric shape. In this case, for example, an inner circumferential portion is configured with the second optical system, and an outer circumferential portion is configured with the first optical system having a ring shape. The first optical system is configured with a reflecting telephoto lens.

(13) The imaging apparatus of any one of (9) to (12), in which the first optical system focusing control part periodically scans the focus position of the first optical system by displacing the focus position of the first optical system in a sine wave shape.

According to the present aspect, the focus position is periodically scanned by displacing the focus position in the sine wave shape. In this case, scanning is performed in both of the forward path and the rearward path.

(14) The imaging apparatus of any one of (9) to (12), in which the first optical system focusing control part periodically scans the focus position of the first optical system by displacing the focus position of the first optical system in a sawtooth wave shape.

According to the present aspect, the focus position is periodically scanned by displacing the focus position in the sawtooth wave shape. In this case, scanning is performed in only the forward path.

(15) The imaging apparatus of any one of (9) to (14), further comprising an in-focus image extraction part that analyzes the motion image or the still image captured by the first optical system in units of scanning and extracts an image of a frame having the highest sharpness or a still image having the highest sharpness as an in-focus image.

According to the present aspect, the in-focus image extraction part that extracts the in-focus image is comprised. The in-focus image extraction part analyzes the motion image or the still image group recorded in the recording part in units of scanning and extracts the image of the frame having the highest sharpness or the still image having the highest sharpness as the in-focus image.

(16) The imaging apparatus of any one of (1) to (15), in which the moving object is a flying object.

According to the present aspect, the moving object is the flying object. For example, the moving object can be an unmanned aerial vehicle (so-called drone) that is remotely operated.

(17) An imaging apparatus comprising an imaging lens including a first optical system and a second optical system that have the same optical axis and have different properties, an image sensor in which pixels that selectively receive light passing through the first optical system and light passing through the second optical system are regularly arranged, and that captures an image formed in the first optical system and an image formed in the second optical system at the same time, a first optical system focusing mechanism that displaces a focus position of the first optical system by moving a part or all of lens groups constituting the first optical system, a first optical system focusing control part that periodically scans the focus position of the first optical system by controlling the first optical system focusing mechanism, an imaging control part that causes the image sensor to continuously capture a motion image or periodically capture a still image, and a recording part in which a motion image or a still image group captured by the first optical system and the motion image or the still image group captured by the second optical system are recorded.

According to the present aspect, two types of images can be captured at the same time on the same axis. Specifically, the imaging lens comprises two optical systems (the first optical system and the second optical system) having different properties, and the image sensor is configured to be capable of capturing an image formed in each optical system at the same time. The two optical systems (the first optical system and the second optical system) have the same optical axis and have different properties. The image sensor is configured by regularly arranging the pixels that selectively receive light passing through the first optical system and light passing through the second optical system, and captures the image formed in the first optical system and the image formed in the second optical system at the same time. That is, the image of the first optical system is captured by a pixel group receiving light passing through the first optical system, and the image of the second optical system is captured by a pixel group receiving light passing through the second optical system. Accordingly, two types of images not having parallax can be captured at the same time by one imaging part. A focusing mechanism (first optical system focusing mechanism) of the first optical system is comprised as the focusing mechanism. The first optical system focusing mechanism displaces the focus position of the first optical system by moving a part or all of the lens groups constituting the first optical system. The first optical system focusing control part is comprised as the focusing control part. The first optical system focusing control part periodically scans the focus position of the first optical system by controlling the first optical system focusing mechanism. Accordingly, in the first optical system, images having different in-focus positions are captured. That is, in the case of capturing the motion image, images having different in-focus positions in each frame are captured. In the case of capturing the still image, still images having different in-focus positions in each scanning are captured. The motion image or the still image group captured by the first optical system and the motion image or the still image group captured by the second optical system are recorded in the recording part. In a case where the motion image or the still image group captured by the first optical system is analyzed in units of scanning, and the image of the frame having the highest sharpness or the still image having the highest sharpness is extracted, the in-focus image is acquired in units of scanning. In the case of performing imaging while moving, an in-focus image can be securely captured in the first optical system in a case where the imaging apparatus moves such that at least one scanning is performed during movement to a position shifted by an imaging range of the first optical system. That is, an image that has a certain overlapping part and is in focus can be captured. For the motion image or the still image group captured by the second optical system, an image corresponding to the extracted in-focus image may be extracted. That is, an image that is captured at the same timing as the image extracted as the in-focus image may be extracted.

For example, the optical systems having different properties are optical systems that can capture different types of images based on a difference in properties of the optical systems, like optical systems having different focal lengths or optical systems having different transmitted wavelength characteristics.

(18) The imaging apparatus of (17), in which in the imaging lens, the second optical system has a shorter focal length than the first optical system.

According to the present aspect, the first optical system and the second optical system constituting the imaging lens have different focal lengths, and the second optical system has a shorter focal length than the first optical system. Accordingly, two images having different focal lengths can be captured at the same time on the same axis, and two types of images not having parallax can be captured. In the case of generating a composite image of a wide range by a process such as mosaic composition, a process such as feature point extraction is performed using the image captured by the second optical system. The image captured by the second optical system is an image in which a wider range than the image captured by the first optical system is captured. Thus, more feature points can be extracted. The composite image is generated using an in-focus image group captured by the first optical system. The image captured by the first optical system is a more telephoto image than the image captured by the second optical system. Thus, a composite image having a higher resolution can be generated.

(19) The imaging apparatus of (18), in which the second optical system is a fixed focal point optical system and performs pan-focus imaging.

According to the present aspect, the second optical system is the fixed focal point optical system and performs pan-focus imaging. The second optical system can be configured with a lens having a short focal length. Thus, pan-focus imaging can be performed.

(20) The imaging apparatus of (18), further comprising a second optical system in-focus state detection part that detects an in-focus state of the second optical system, a second optical system focusing mechanism that displaces a focus position of the second optical system by moving a part or all of lens groups constituting the second optical system, and a second optical system focusing control part that controls the second optical system focusing mechanism and causes the second optical system to focus on a subject based on a detection result of the second optical system in-focus state detection part.

According to the present aspect, the second optical system in-focus state detection part that detects the in-focus state of the second optical system, a focusing mechanism (second optical system focusing mechanism) of the second optical system, and a control part (second optical system focusing control part) of the focusing mechanism of the second optical system are comprised. The second optical system focusing mechanism displaces the focus position of the second optical system by moving a part or all of the lens groups constituting the second optical system. The second optical system focusing control part controls the second optical system focusing mechanism and causes the second optical system to focus on the subject based on the detection result of the second optical system in-focus state detection part. Accordingly, in the second optical system, the in-focus image can be accurately captured.

(21) The imaging apparatus of any one of (18) to (20), in which in the imaging lens, the first optical system and the second optical system are arranged in a concentric shape.

According to the present aspect, the first optical system and the second optical system are arranged in the concentric shape. In this case, for example, an inner circumferential portion is configured with the second optical system, and an outer circumferential portion is configured with the first optical system having a ring shape. The first optical system is configured with a reflecting telephoto lens.

(22) The imaging apparatus of any one of (17) to (21), in which the first optical system focusing control part periodically scans the focus position of the first optical system by displacing the focus position of the first optical system in a sine wave shape.

According to the present aspect, the focus position is periodically scanned by displacing the focus position in the sine wave shape. In this case, scanning is performed in both of the forward path and the rearward path.

(23) The imaging apparatus of any one of (17) to (21), in which the first optical system focusing control part periodically scans the focus position of the first optical system by displacing the focus position of the first optical system in a sawtooth wave shape.

According to the present aspect, the focus position is periodically scanned by displacing the focus position in the sawtooth wave shape. In this case, scanning is performed in only the forward path.

(24) The imaging apparatus of any one of (17) to (23), further comprising an in-focus image extraction part that analyzes the motion image or the still image captured by the first optical system in units of scanning and extracts an image of a frame having the highest sharpness or a still image having the highest sharpness as an in-focus image.

According to the present aspect, the in-focus image extraction part that extracts the in-focus image is comprised. The in-focus image extraction part analyzes the motion image or the still image group recorded in the recording part in units of scanning and extracts the image of the frame having the highest sharpness or the still image having the highest sharpness as the in-focus image.

(25) An image composition apparatus comprising the imaging apparatus of (8), and a composite image generation part that acquires a plurality of the in-focus images from the imaging apparatus and generates one composite image by linking the plurality of acquired in-focus images.

According to the present aspect, the composite image is generated using the extracted in-focus image. Each individual in-focus image is a high detail image focused on an imaging target. Thus, a high detail composite image can be generated. In addition, each in-focus image has an overlapping region. Thus, the composite image can be securely generated.

(26) The image composition apparatus of (25), further comprising an imaging condition estimation part that acquires the plurality of in-focus images from the imaging apparatus and estimates a relative position and attitude of the imaging part in capturing of each of the in-focus images by analyzing the plurality of acquired in-focus images, in which the composite image generation part arranges each of the in-focus images and generates the composite image based on an estimation result of the imaging condition estimation part.

According to the present aspect, the relative position and attitude of the imaging part in capturing of each in-focus image are estimated by analyzing an in-focus image group acquired by imaging. The composite image is generated based on the estimation result. That is, the composite image is generated by arranging each in-focus image based on the estimated position and attitude. The attitude is specified as the direction of the optical axis and rotation about the optical axis.

(27) The image composition apparatus of (26), in which the imaging condition estimation part applies a SfM process to the plurality of acquired in-focus images and estimates the relative position and attitude of the imaging part in capturing of each of the in-focus images.

According to the present aspect, the relative position and attitude of the imaging part in capturing of each in-focus image are estimated by performing the structure from motion (SfM) process on the in-focus image group acquired by imaging. The SfM process is a process of restoring a three-dimensional shape of the subject and the relative position and attitude of the imaging part from a plurality of images having different viewpoints.

(28) An image composition apparatus comprising the imaging apparatus of (15), and a composite image generation part that acquires a plurality of the in-focus images from the imaging apparatus and generates one composite image by linking the plurality of acquired in-focus images.

According to the present aspect, the composite image is generated using the extracted in-focus image. Each individual in-focus image is a high detail image focused on an imaging target and is a telephoto image. Thus, a high detail composite image can be generated. In addition, each in-focus image has an overlapping region. Thus, the composite image can be securely generated.

(29) The image composition apparatus of (28), further comprising an imaging condition estimation part that acquires an image of the second optical system corresponding to each of the in-focus images from the imaging apparatus and estimates a relative position and attitude of the imaging part in capturing of each of the in-focus images by analyzing a plurality of the acquired images of the second optical system, in which the composite image generation part arranges each of the in-focus images and generates the composite image based on an estimation result of the imaging condition estimation part.

According to the present aspect, the relative position and attitude of the imaging part in capturing of each in-focus image are estimated by analyzing an image group of the second optical system corresponding to each in-focus image. The composite image is generated based on the estimation result. That is, the composite image is generated by arranging each in-focus image based on the estimated position and attitude. The image of the second optical system corresponding to each in-focus image is the image of the second optical system captured at the same timing as each in-focus image. In the case of the motion image, the image of the second optical system is the image of the same frame. In the case of the still image, the image of the second optical system is the still image captured at the same timing. The image captured by the second optical system is an image of a wider angle of view than the image captured by the first optical system. Thus, more feature points necessary for analysis can be extracted. Accordingly, the relative position and attitude of the imaging part can be estimated with higher accuracy. Thus, the composite image can be generated with higher accuracy.

(30) The image composition apparatus of (29), in which the imaging condition estimation part applies a SfM process to the plurality of acquired images of the second optical system and estimates the relative position and attitude of the imaging part in capturing of each of the in-focus images.

According to the present aspect, the relative position and attitude of the imaging part in capturing of each in-focus image are estimated by performing the structure from motion (SfM) process on the in-focus image group acquired by imaging.

According to the present invention, an in-focus image can be captured while moving. In addition, a high detail composite image can be generated.

DESCRIPTION OF THE PREFERRED EMBODIMENTS

Hereinafter, exemplary embodiments of the present invention will be described in detail in accordance with the appended drawings.

♦♦First Embodiment of Imaging Apparatus♦♦

[Apparatus Configuration of Imaging Apparatus]

Figure 1:
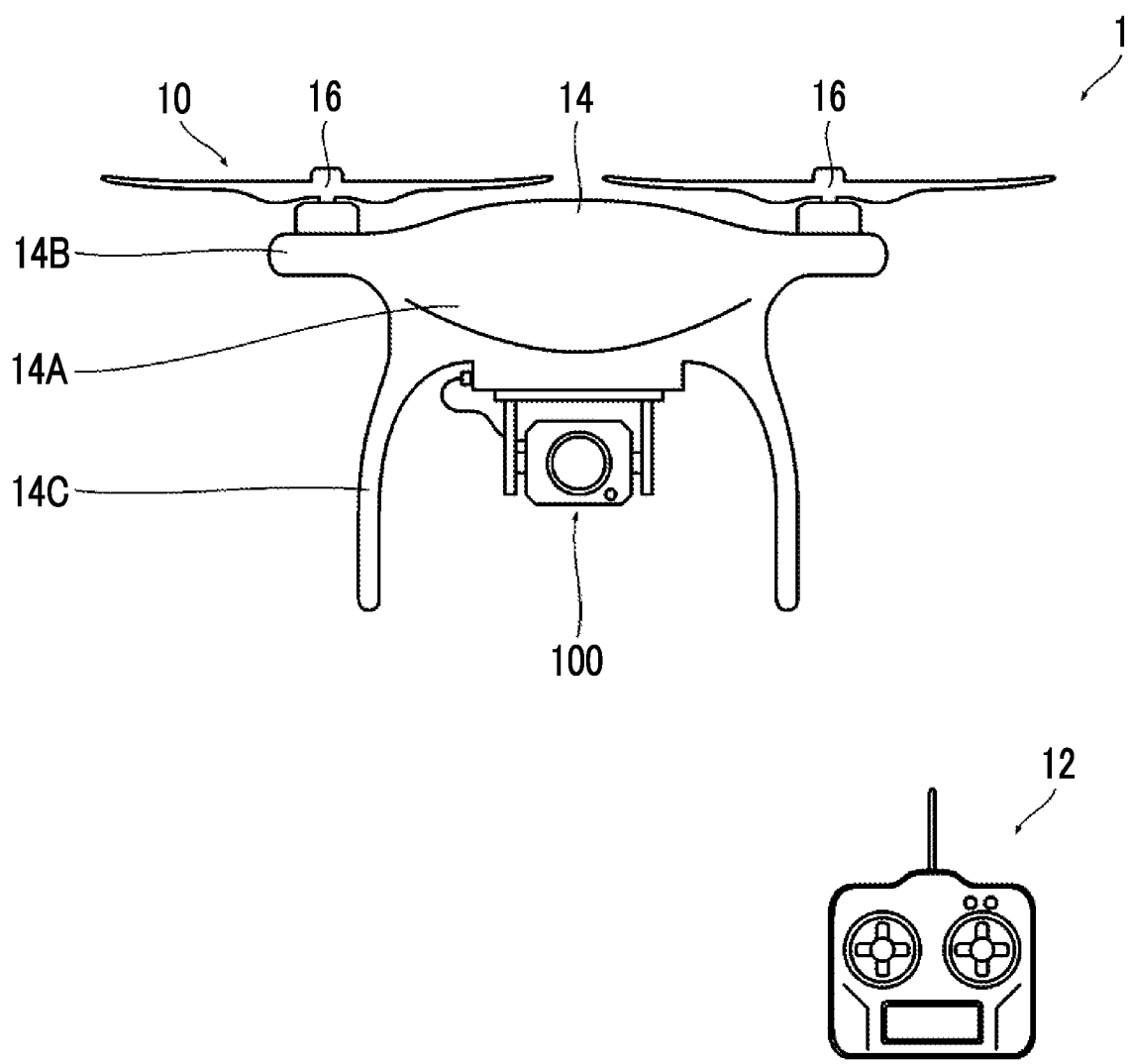
FIG. 1 is a system configuration diagram of an imaging apparatus.

FIG. 1 is a system configuration diagram of an imaging apparatus.

As illustrated in FIG. 1, an imaging apparatus 1 of the present embodiment is configured to comprise an unmanned aerial vehicle 10 and a camera 100 mounted on the unmanned aerial vehicle 10.

<Unmanned Aerial Vehicle>

The unmanned aerial vehicle 10 is one example of a moving object and a flying object. The unmanned aerial vehicle 10 is a so-called drone and flies in the air based on an operation performed by a controller 12.

<Exterior Configuration of Unmanned Aerial Vehicle>

As illustrated in FIG. 1, the unmanned aerial vehicle 10 is configured to comprise a plurality of flying propellers 16 in a main body frame 14.

The main body frame 14 is configured to comprise a torso portion 14A, four arm portions 14B (only two are illustrated in FIG. 1) radially extending from the torso portion 14A, and four leg portions 14C (only two are illustrated in FIG. 1) radially extending from the torso portion 14A.

The propeller 16 is comprised at the distal end of each arm portion 14B. Accordingly, four propellers 16 are comprised in the unmanned aerial vehicle 10 of the present embodiment (only two are illustrated in FIG. 1).

The unmanned aerial vehicle 10 flies in the air by buoyant force generated by rotating the propellers 16. The unmanned aerial vehicle 10 performs upward movement, downward movement, direction change, and the like by individually controlling the rotation of each propeller 16. In addition, a flight speed is controlled by individually controlling the rotation of each propeller 16.

<Electric Configuration of Unmanned Aerial Vehicle>

Figure 2:
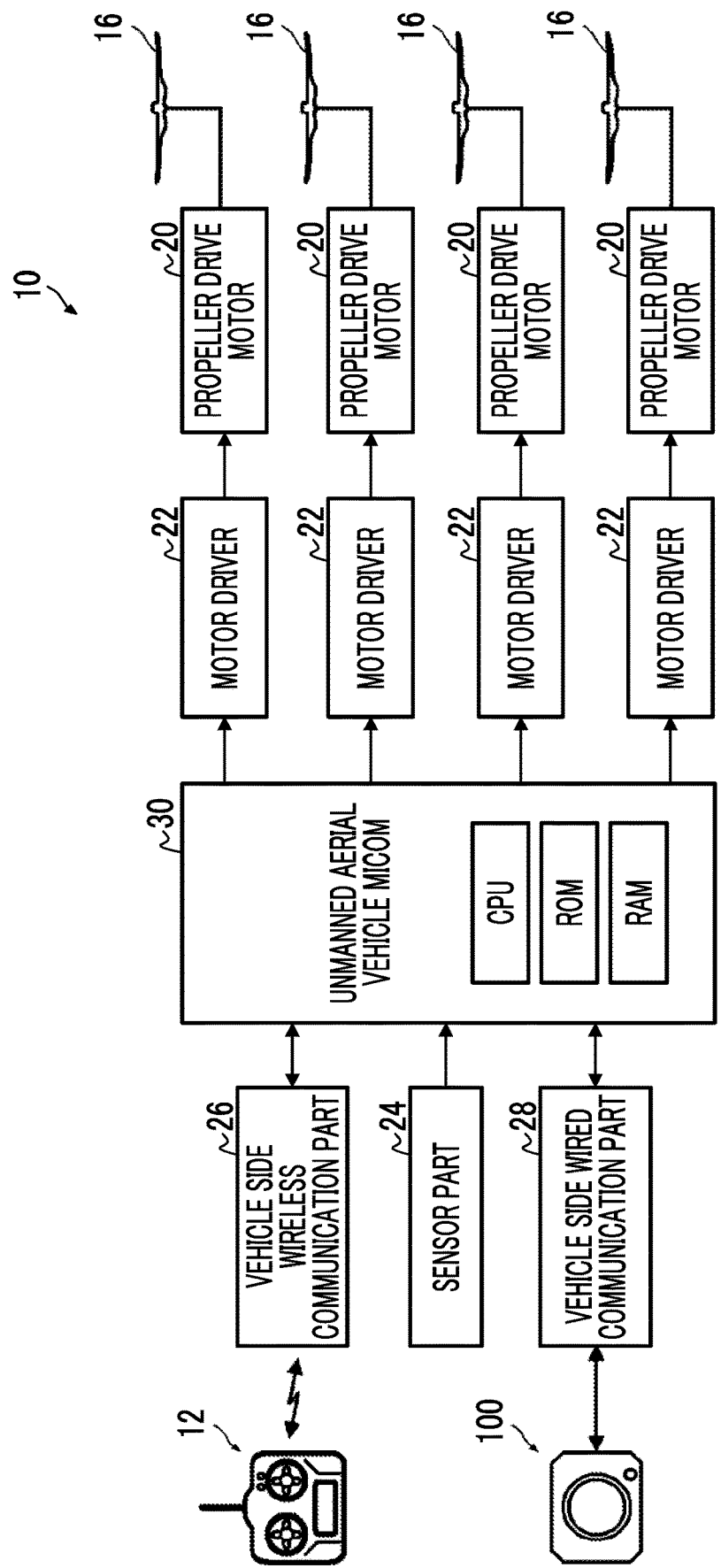
FIG. 2 is a block diagram illustrating an electric configuration of an unmanned aerial vehicle.

FIG. 2 is a block diagram illustrating an electric configuration of the unmanned aerial vehicle.

The unmanned aerial vehicle 10 comprises a propeller drive motor 20, a motor driver 22, a sensor part 24, a vehicle side wireless communication part 26, a vehicle side wired communication part 28, and an unmanned aerial vehicle micom (micom: microcomputer) 30.

The propeller drive motor 20 is rotation drive means of the propeller 16. The propeller drive motor 20 is comprised for each propeller 16. Driving of each propeller drive motor 20 is individually controlled by the motor driver 22. Each motor driver 22 controls the driving of the propeller drive motor 20 in response to an instruction from the unmanned aerial vehicle micom 30.

The sensor part 24 detects a flight state of the vehicle. The sensor part 24 is configured to comprise various sensors such as a gyro sensor, a geomagnetic sensor, an acceleration sensor, a speed sensor, an altitude sensor, and a global positioning system (GPS). The sensor part 24 outputs information of the flight state of the vehicle detected by various sensors to the unmanned aerial vehicle micom 30.

The vehicle side wireless communication part 26 wirelessly communicates with the controller 12 and transmits and receives various signals with the controller 12 under control of the unmanned aerial vehicle micom 30. For example, in a case where the controller 12 is operated, a control signal based on the operation is transmitted to the unmanned aerial vehicle 10 from the controller 12. The vehicle side wireless communication part 26 receives the control signal transmitted from the controller 12 and outputs the control signal to the unmanned aerial vehicle 10. The method of communication is not particularly limited. A generally used communication method (for example, a communication method based on a wireless local area network (LAN) standard, a communication method based on a specific power saving wireless standard, and a communication method using a mobile phone network) is used.

The vehicle side wired communication part 28 communicates with the camera 100 in a wired manner and transmits and receives various signals with the camera 100 under control of the unmanned aerial vehicle micom 30. The method of communication is not particularly limited. A generally used communication method (for example, a communication method based on a Universal Serial Bus (USB) standard) is used.

The unmanned aerial vehicle micom 30 is a control part that controls the operation of the whole unmanned aerial vehicle 10. The unmanned aerial vehicle micom 30 comprises a central processing unit (CPU), a read only memory (ROM), and a random access memory (RAM) and implements various functions by executing a predetermined program. The program is stored in the ROM.

Figure 3:
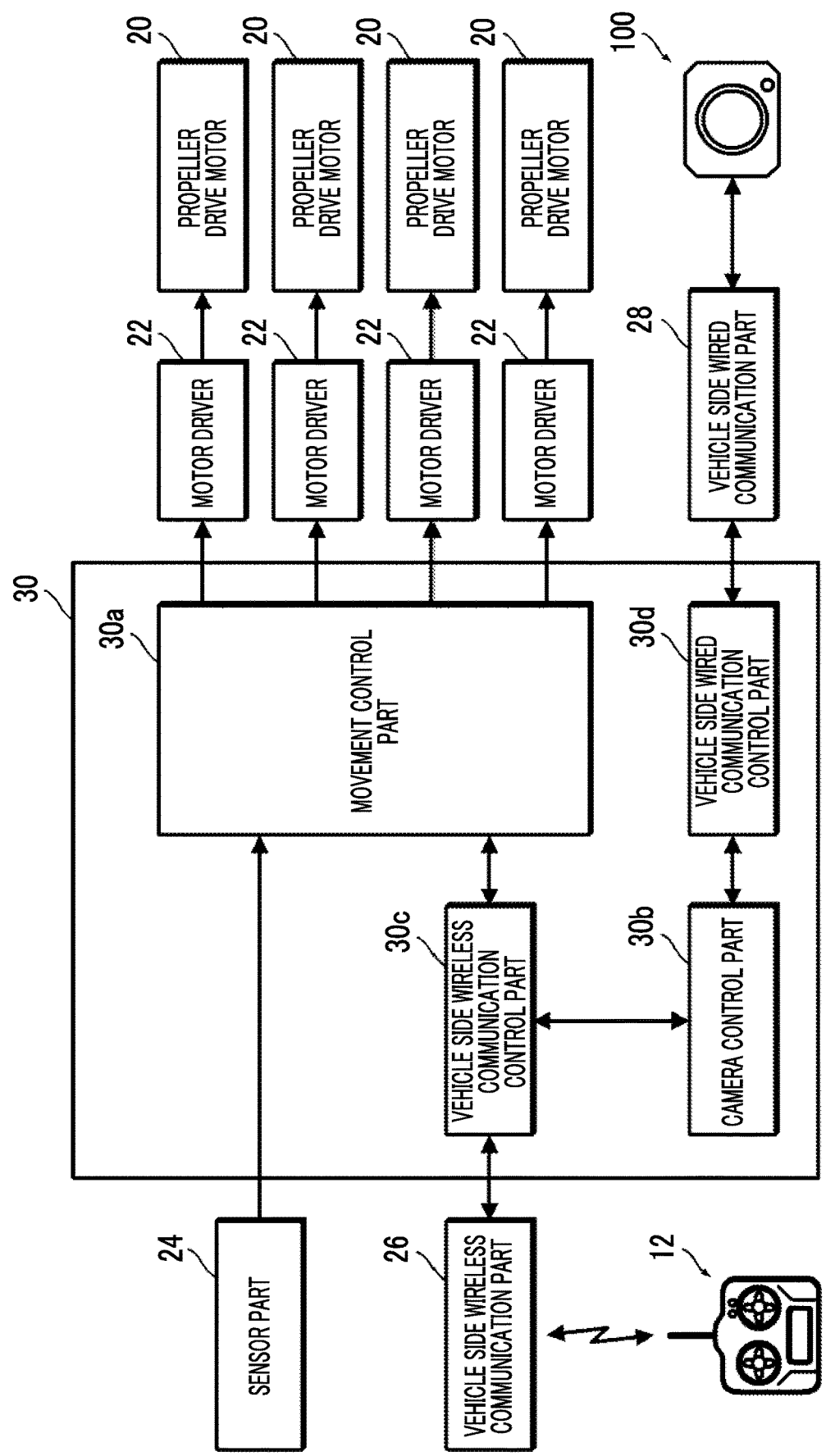
FIG. 3 is a block diagram of main functions implemented by an unmanned aerial vehicle micom.

FIG. 3 is a block diagram of main functions implemented by the unmanned aerial vehicle micom.

The unmanned aerial vehicle micom 30 functions as a movement control part 30a, a camera control part 30b, a vehicle side wireless communication control part 30c, a vehicle side wired communication control part 30d, and the like by executing the predetermined program.

The movement control part 30a controls the flight (movement) of the unmanned aerial vehicle 10 by controlling driving of each propeller drive motor 20 through the motor driver 22. The movement control part 30a controls driving of each propeller drive motor 20 and controls the flight of the unmanned aerial vehicle 10 based on the control signal transmitted from the controller 12 and the information of the flight state of the vehicle output from the sensor part 24. For example, in a case where an upward movement instruction is provided from the controller 12, driving of each propeller drive motor 20 is controlled such that the vehicle moves upward. In a case where a downward movement instruction is provided from the controller 12, driving of each propeller drive motor 20 is controlled such that the vehicle moves downward. In a case where a revolution instruction is provided from the controller 12, driving of each propeller drive motor 20 is controlled such that the vehicle revolves to a direction of the instruction. During imaging, driving of each propeller drive motor 20 is controlled such that the vehicle flies at a predetermined speed. Flight control of the vehicle during imaging will be described in detail below.

The camera control part 30b controls the camera 100 based on the control signal transmitted from the controller 12. For example, the camera 100 starts imaging in response to an imaging start instruction from the controller 12. The camera 100 finishes imaging in response to an imaging finish instruction from the controller 12.

The vehicle side wireless communication control part 30c controls communication with the controller 12 through the vehicle side wireless communication part 26.

The vehicle side wired communication control part 30d controls communication with the camera 100 through the vehicle side wired communication part 28.

<Configuration of Controller>

Figure 4:
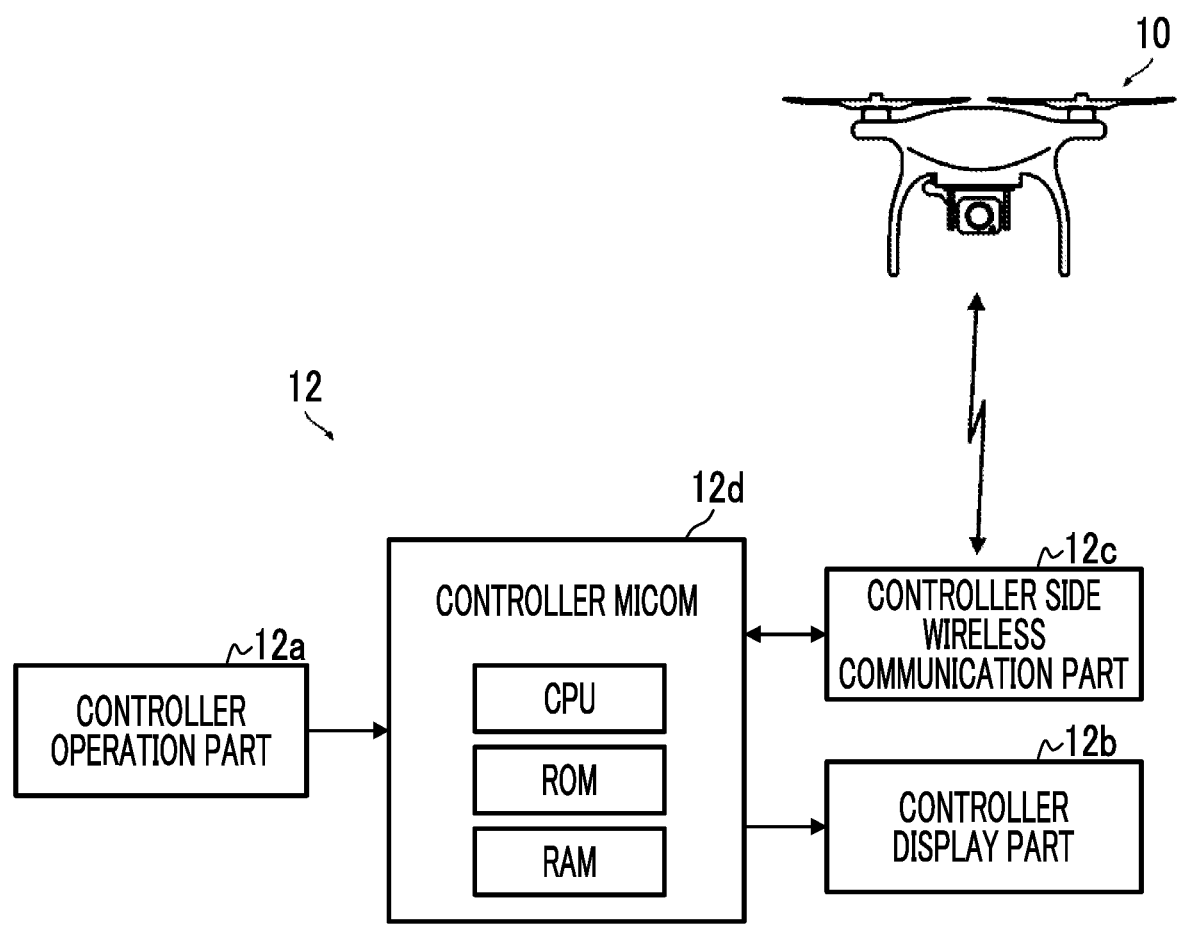
FIG. 4 is a block diagram illustrating an electric configuration of a controller.

FIG. 4 is a block diagram illustrating an electric configuration of the controller.

The controller 12 comprises a controller operation part 12a, a controller display part 12b, a controller side wireless communication part 12c, and a controller micom 12d.

The controller operation part 12a is configured to comprise various operation members that operate the unmanned aerial vehicle 10 and the camera 100. For example, the operation members operating the unmanned aerial vehicle 10 include an operation member providing the upward movement instruction and the downward movement instruction for the unmanned aerial vehicle 10, and an operation member providing the revolution instruction for the unmanned aerial vehicle 10. For example, the operation members operating the camera 100 include an operation member providing the imaging start instruction and the imaging finish instruction.

For example, the controller display part 12b is configured with a liquid crystal display (LCD). For example, the information of the flight state of the unmanned aerial vehicle 10 is displayed on the controller display part 12b.

The controller side wireless communication part 12c wirelessly communicates with the unmanned aerial vehicle 10 and transmits and receives various signals with the unmanned aerial vehicle 10 under control of the controller micom 12d.

The controller micom 12d is a control part that controls the operation of the whole controller 12. The unmanned aerial vehicle micom 30 comprises a CPU, a ROM, and a RAM and implements various functions by executing a predetermined program. For example, in a case where the controller operation part 12a is operated, the controller micom 12d generates a control signal corresponding to the operation and transmits the control signal to the unmanned aerial vehicle 10 through the controller side wireless communication part 12c. In addition, for example, the controller micom 12d acquires the information of the flight state from the unmanned aerial vehicle 10 through the controller side wireless communication part 12c and displays the information of the flight state on the controller display part 12b. The program is stored in the ROM.

<Camera>

Figure 5:
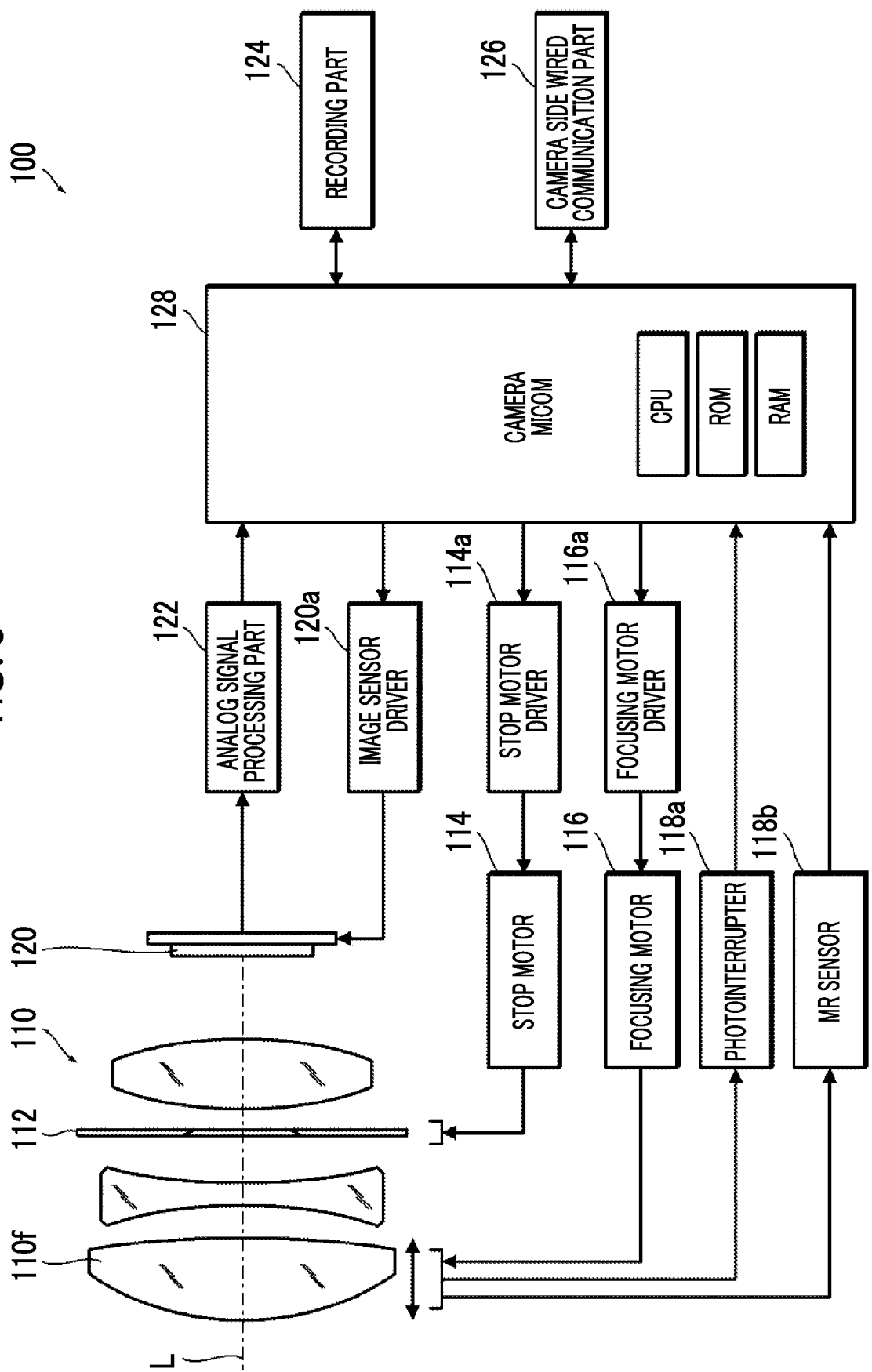
FIG. 5 is a block diagram illustrating a schematic configuration of a camera.

FIG. 5 is a block diagram illustrating a schematic configuration of the camera.

The camera 100 is one example of an imaging part and is configured with a single lens camera. The camera 100 is mounted on the unmanned aerial vehicle 10 through a tripod head. An imaging direction is adjusted using the tripod head.

The camera 100 continuously images a motion image in response to an imaging instruction from the controller 12. As illustrated in FIG. 5, the camera 100 is configured to comprise an imaging lens 110, an image sensor 120, an analog signal processing part 122, a recording part 124, a camera side wired communication part 126, a camera micom 128, and the like.

The imaging lens 110 is configured with a single focal length lens and comprises a stop 112 and a focusing mechanism.

For example, the stop 112 is configured with an iris stop. The stop 112 comprises a stop motor 114 as drive means of the stop 112. The opening amount of the stop 112 changes by driving the stop motor 114.

The focusing mechanism displaces a focus position of the imaging lens 110 by moving a part of a plurality of lens groups constituting the imaging lens 110 forward and rearward along an optical axis L. Specifically, the focus position of the imaging lens 110 is displaced by moving a focusing lens group 110f forward and rearward along the optical axis L. The focusing mechanism is configured to comprise a support part (not illustrated) that supports the focusing lens group 110f to be movable along the optical axis L, and a focusing motor 116 that moves the focusing lens group 110f along the optical axis L. For example, the focusing motor 116 is configured with a linear motor.

The imaging lens 110 comprises a photointerrupter 118a and a magneto resistive (MR) sensor 118b as means for detecting the position of the focusing lens group 110f. The photointerrupter 118a detects a state where the focusing lens group 110f is positioned at a predetermined origin. The MR sensor 118b detects the amount of displacement of the focusing lens group 110f. The photointerrupter 118a detects a state where the focusing lens group 110f is positioned at the origin, and the MR sensor 118b detects the amount of displacement from the origin. Thus, the position of the focusing lens group 110f with respect to the origin can be detected. The detection results of the photointerrupter 118a and the MR sensor 118b are output to the camera micom 128. The camera micom 128 detects the position of the focusing lens group 110f based on the outputs of the photointerrupter 118a and the MR sensor 118b.

The image sensor 120 captures an image formed in the imaging lens 110. For example, the image sensor 120 is configured with a solid-state imaging element such as a complementary metal oxide semiconductor (CMOS) or a charged coupled device (CCD) having a predetermined color filter arrangement.

The analog signal processing part 122 acquires an analog image signal of each pixel output from the image sensor 120, performs predetermined signal processing (for example, a two correlation pile sampling process and gain adjustment) on the analog signal, then converts the analog signal into a digital signal, and outputs the digital signal. The digital image signal output from the analog signal processing part 122 is acquired by the camera micom 128.

The recording part 124 is a recording part of various data. Captured image data is recorded in the recording part 124. The recording part 124 is configured with a storage device using a non-volatile memory such as a solid state drive (SSD).

The camera side wired communication part 126 communicates with the unmanned aerial vehicle 10 in a wired manner and transmits and receives various signals with the unmanned aerial vehicle 10 under control of the camera micom 128.

The camera micom 128 is a control part that controls the operation of the whole camera 100. The camera micom 128 comprises a CPU, a ROM, and a RAM and implements various functions by executing a predetermined program. The program is stored in the ROM.

Figure 6:
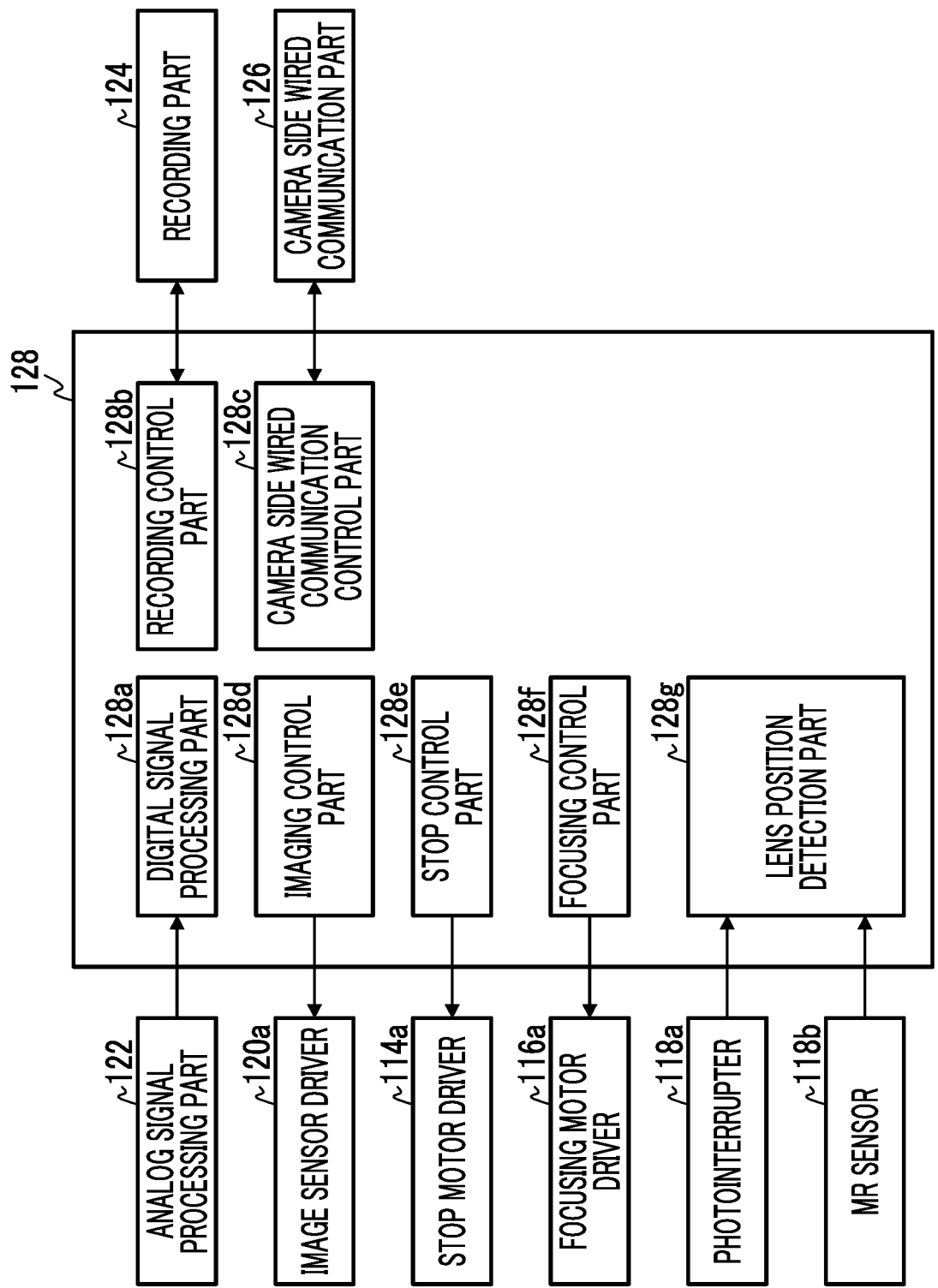
FIG. 6 is a block diagram of main functions implemented by a camera micom.

FIG. 6 is a block diagram of main functions implemented by the camera micom.

As illustrated in FIG. 6, the camera micom 128 functions as a digital signal processing part 128a, a recording control part 128b, a camera side wired communication control part 128c, an imaging control part 128d, a stop control part 128e, a focusing control part 128f, a lens position detection part 128g, and the like by executing the predetermined program.

The digital signal processing part 128a acquires the analog image signal output from the analog signal processing part 122 and generates image data by performing predetermined signal processing (for example, color interpolation, color separation, color balance adjustment, gamma correction, and an image highlight process) on the analog image signal.

The recording control part 128b controls writing of data into the recording part 124. The image data acquired by imaging is recorded in the recording part 124 by the recording control part 128b.

The camera side wired communication control part 128c controls communication with the unmanned aerial vehicle 10 through the camera side wired communication part 126.

The imaging control part 128d controls driving of the image sensor 120 through an image sensor driver 120a. More specifically, driving of the image sensor 120 is controlled such that a motion image is captured at a predetermined frame rate.

The stop control part 128e controls driving of the stop motor 114 through the stop driver 114a. More specifically, driving of the stop motor 114 is controlled such that the stop 112 has a predetermined F number (opening amount). The F number is set based on a signal acquired from the image sensor 120. That is, the F number is set such that appropriate exposure is performed.

The focusing control part 128f controls driving of the focusing motor 116 through the focusing motor driver 116a. Specifically, driving of the focusing motor 116 is controlled such that the focus position is periodically scanned.

The "scanning" of the focus position refers to an operation of displacing the focus position from one end to another end within a predetermined range. The "periodic scanning" refers to repeated execution of scanning in a constant cycle.

In the camera 100 of the present embodiment, the focus position is periodically scanned by displacing the focus position in a sine wave shape between a closest end and an infinite end.

Figure 7:
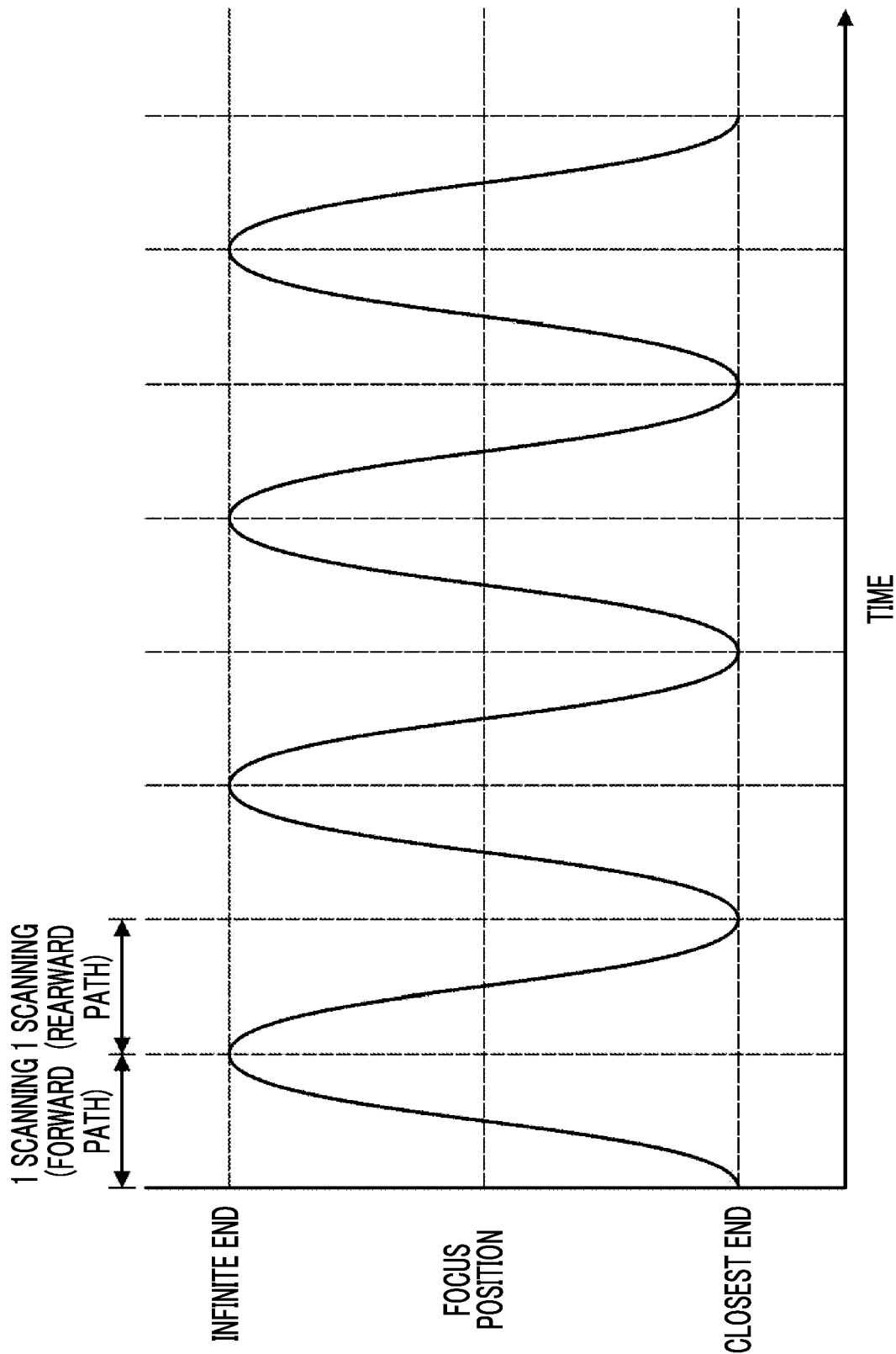
FIG. 7 is a conceptual diagram of scanning.

FIG. 7 is a conceptual diagram of scanning. In FIG. 7, a vertical axis denotes the focus position, and a horizontal axis denotes time.

As illustrated in FIG. 7, the focus position is displaced in the sine wave between the closest end and the infinite end. In this case, scanning is performed in both of a forward path and a rearward path. That is, scanning (scanning in the forward path) in the direction of the position of the infinite end from the position of the closest end and scanning (scanning in the rearward path) in the direction of the position of the closest end from the position of the infinite end are periodically repeated. Each of the scanning in the forward path and the scanning in the rearward path corresponds to one scanning. Accordingly, in this case, scanning is performed twice forward and rearward.

The lens position detection part 128g detects the position of the focusing lens group 110f based on the outputs of the photointerrupter 118a and the MR sensor 118b.

The focusing control part 128f controls driving of the focusing motor 116 and periodically scans the focus position based on the position of the focusing lens group 110f.

[Effect of Imaging Apparatus]

<Basic Operation>

<Basic Operation of Unmanned Aerial Vehicle>

The unmanned aerial vehicle 10 flies in the air based on the operation of the controller 12. Specifically, the unmanned aerial vehicle 10 moves upward in response to the upward movement instruction and moves downward in response to the downward movement instruction from the controller 12. In addition, the unmanned aerial vehicle 10 revolves to the direction of the instruction in response to the revolution instruction.

<Basic Operation of Camera>

The camera 100 also performs imaging based on the operation of the controller 12. That is, capturing of a motion image is started in response to the imaging start instruction from the controller 12. Capturing of the motion image is finished in response to the imaging finish instruction from the controller 12. The motion image is continuously captured from the start of imaging until the imaging finish instruction is provided. The captured motion image is recorded in the recording part 124.

The focus position is periodically scanned during imaging. That is, the focus position is periodically scanned by displacing the focus position in the sine wave shape between the closest end and the infinite end. Accordingly, an image of at least one frame in focus can be captured for each scanning.

<Operation of Unmanned Aerial Vehicle During Imaging>

During imaging, the unmanned aerial vehicle 10 flies at an almost constant altitude. Accordingly, only revolution can be the operation during imaging.

The unmanned aerial vehicle micom 30 functioning as the movement control part 30a controls each propeller drive motor 20 and flies (including hovering) at an almost constant altitude based on the output from the sensor part 24.

In addition, during imaging, the unmanned aerial vehicle 10 flies at a speed that is controlled as follows. That is, the flight speed is controlled such that at least one scanning is performed during movement to a position shifted by an imaging range.

Figure 8:
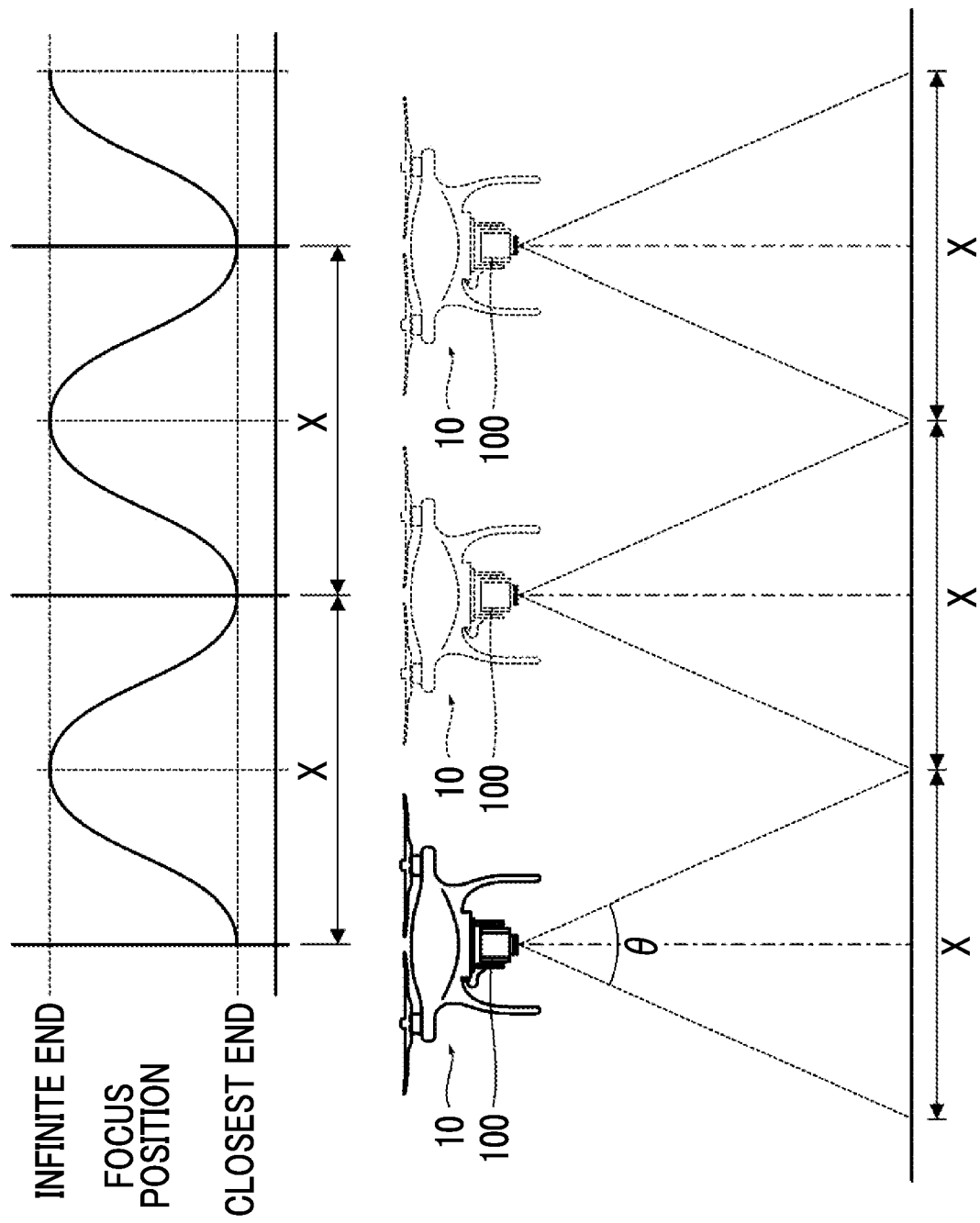
FIG. 8 is a conceptual diagram of setting of a flight speed of the unmanned aerial vehicle during imaging.

FIG. 8 is a conceptual diagram of setting of the flight speed of the unmanned aerial vehicle during imaging.

A case of imaging a space immediately below the camera 100 from a constant altitude is considered. In this case, a range of an angle θ is imaged by the camera 100.

The width of the imaging range in the movement direction of the unmanned aerial vehicle 10 is denoted by X. In this case, the unmanned aerial vehicle 10 is set to a speed at which at least one scanning is performed during movement by the distance X.

FIG. 8 illustrates an example of a case of setting a speed at which scanning is performed twice during movement by the distance X. In this case, in a case where a time period required for one scanning is denoted by T, a speed V of the unmanned aerial vehicle 10 is set as V=X/2T.

The imaging range can be calculated from the angle θ and the subject distance. The value of the subject distance can be approximately acquired from the altitude of the unmanned aerial vehicle 10. That is, since the unmanned aerial vehicle 10 is at an almost constant altitude during imaging, an approximate subject distance can be estimated from the altitude of the unmanned aerial vehicle 10. Accordingly, the value of the imaging range can be approximately acquired in advance. In addition, the speed of the unmanned aerial vehicle 10 for satisfying the above condition can be set from the imaging range acquired in advance. That is, the speed for performing at least one scanning during movement to the position shifted by the imaging range can be set. In the present example, the speed at which scanning is performed twice is set. The unmanned aerial vehicle micom 30 of the unmanned aerial vehicle 10 functioning as the movement control part 30a controls driving of each propeller drive motor 20 to move at the set speed during imaging.

<Processing of Captured Image>

The motion image acquired by imaging is recorded in the recording part 124. The motion image is a motion image in which the focus position periodically changes. The focus position is displaced from the position of the closest end to the position of the infinite end in one scanning. Accordingly, an image of at least one frame in focus can be acquired for each scanning.

An in-focus image can be extracted in units of scanning by analyzing the motion image acquired by imaging in units of scanning and extracting an image of a frame having the highest sharpness.

Figure 9:
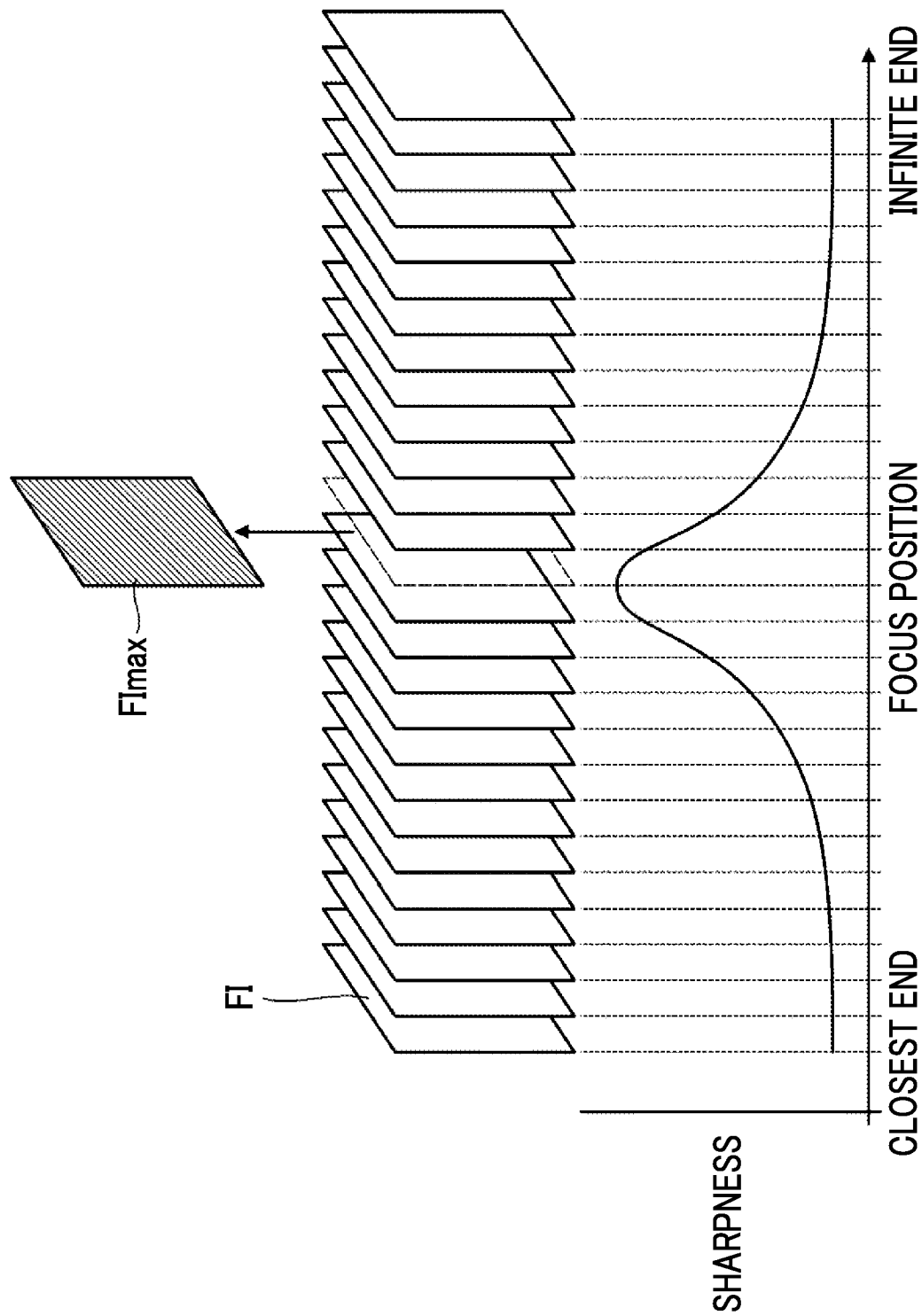
FIG. 9 is a conceptual diagram of extraction of an in-focus image.

FIG. 9 is a conceptual diagram of extraction of the in-focus image.

The motion image acquired by imaging is analyzed in units of scanning, and the image of the frame having the highest sharpness is extracted. Specifically, the sharpness of an image FI constituting each frame is acquired, and an image FImax of a frame having the highest sharpness is extracted in units of scanning. This process may be performed by the camera 100 or may be performed by a dedicated image processing apparatus.

In the case of performing the process by the camera 100, the camera micom 128 implements a function of performing the process. In this case, the camera micom 128 functions as an in-focus image extraction part by executing the predetermined program and executes the process. The extraction of the in-focus image may be performed in real time or may be collectively performed after the end of imaging. In the case of performing the extraction in real time, an in-focus image extraction process is performed each time scanning is finished.

In the case of performing the extraction by the dedicated image processing apparatus, for example, a computer functions as the image processing apparatus. That is, the computer functions as an apparatus performing the above process by executing a predetermined program.

[Modification Example]

<Setting of Speed of Unmanned Aerial Vehicle>

As described above, the speed of the unmanned aerial vehicle 10 during imaging is set to the speed at which at least one scanning is performed during movement to the position shifted by the imaging range of the camera 100. Accordingly, the in-focus image having an overlapping part can be captured In a case where the efficiency of imaging is considered, it is preferable that the speed of the unmanned aerial vehicle 10 during imaging is set to a speed at which one scanning is completed at the same time as movement to the position shifted by the imaging range. Accordingly, a desired range can be imaged in a short time period.

Figure 10:
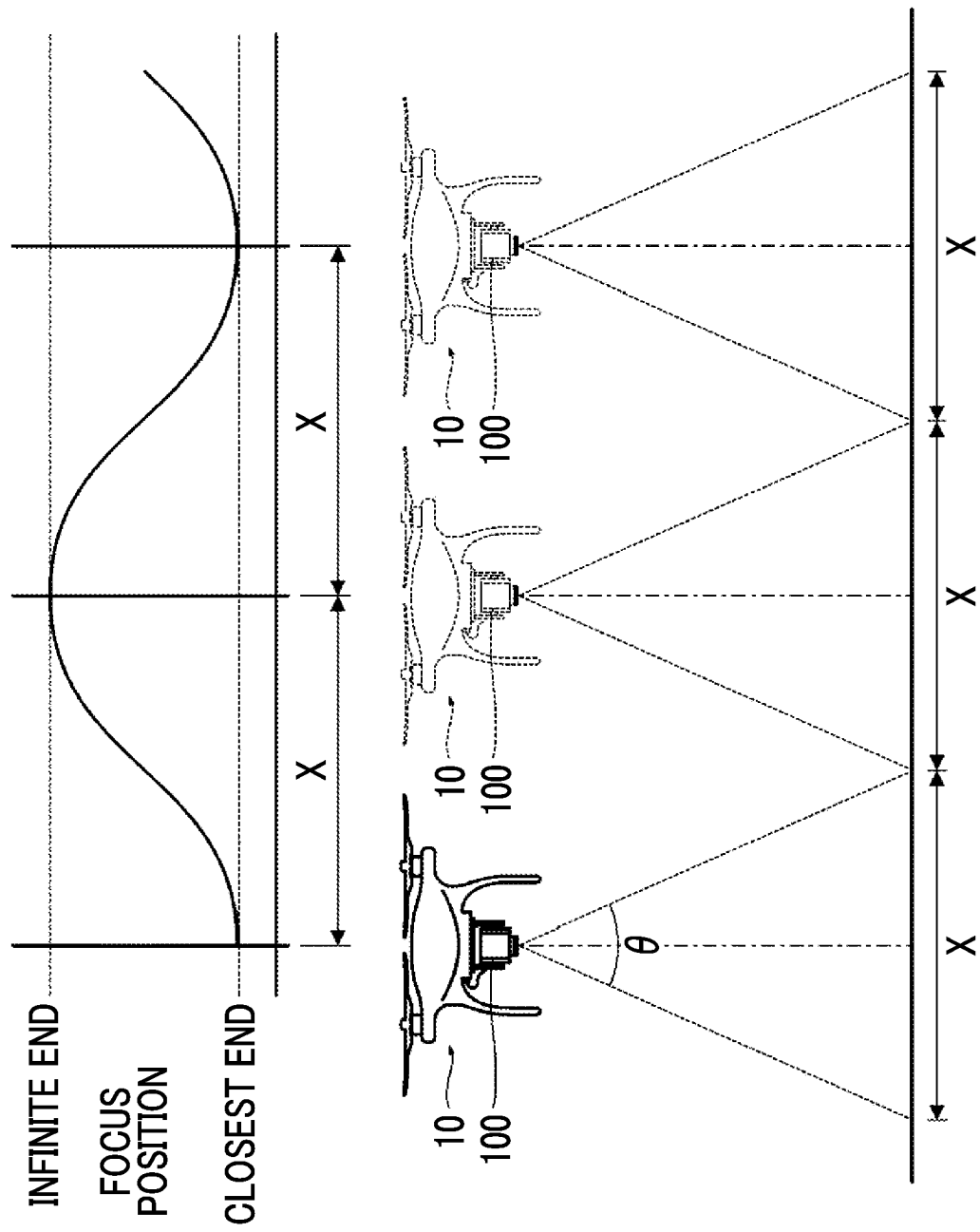
FIG. 10 is a conceptual diagram of setting of the flight speed of the unmanned aerial vehicle in a case of completing movement at the same time as scanning.

FIG. 10 is a conceptual diagram of setting of the flight speed of the unmanned aerial vehicle in the case of completing movement at the same time as scanning.

In a case where the width of the imaging range of the camera 100 in the movement direction of the unmanned aerial vehicle 10 is denoted by X, the speed of the unmanned aerial vehicle 10 is set such that one scanning is completed at the same time as the movement of the unmanned aerial vehicle 10 by the distance X. In this case, in a case where the time period for one scanning is denoted by T, the speed V of the unmanned aerial vehicle 10 is set as V=X/T.

The "same time" does not require strict simultaneity and includes a range that is regarded as being almost the same time. Accordingly, a slight deviation is allowed. The speed of the unmanned aerial vehicle 10 may be set to the speed at which one scanning is completed at almost the same timing as movement to the position shifted by the imaging range.

In actuality, it is necessary to consider overlapping. Thus, the unmanned aerial vehicle 10 is set to a speed at which one scanning is completed slightly faster than movement to the position shifted by the imaging range.

The width X of the imaging range of the camera 100 in the movement direction of the unmanned aerial vehicle 10 changes depending on the movement direction of the unmanned aerial vehicle 10. Accordingly, in the case of performing imaging while turning to any direction, it is preferable to correct the speed depending on the movement direction of the unmanned aerial vehicle 10.

The imaging range also changes in a case where the direction (imaging direction) of the camera 100 is changed. Thus, it is further preferable to correct the speed depending on the direction of the camera 100.

In the case of performing imaging while flying at a constant speed, a speed at which at least one scanning is performed during movement to a position shifted by the width of the imaging range in a short direction of the imaging range is set. Accordingly, even in the case of performing imaging while flying in any direction, the overlapping in-focus image can be captured. In this case, the maximum speed is a speed at which one scanning is completed at the same time as movement to the position shifted by the width of the imaging range in the short direction of the imaging range.

<Adjustment of Flight Speed>

As described above, the unmanned aerial vehicle 10 flies at an almost constant altitude during imaging. However, there is also a case where the unmanned aerial vehicle 10 cannot fly at a constant altitude due to the effect of wind and the like.

In a case where the unmanned aerial vehicle 10 comprises altitude measurement means such as an altitude sensor, it is preferable to acquire information of the altitude from the altitude measurement means and adjust the flight speed. For example, the adjustment is performed in the following procedure. First, the information of the altitude is acquired. Next, the subject distance is estimated based on the acquired information of the altitude. Next, the current imaging range is calculated from the estimated subject distance and an angle of view. The speed of the unmanned aerial vehicle 10 is corrected based on information of the calculated current imaging range. In a case where the angle of view is constant, the imaging range is decreased in a case where the altitude is decreased (=the subject distance is decreased). Thus, the flight speed is decreased. In a case where the altitude is increased (=the subject distance is increased), the imaging range is increased. Thus, the flight speed is increased.

By adjusting the flight speed depending on the altitude of the unmanned aerial vehicle 10, imaging can be appropriately performed even under an unstable environment.

For example, the process of calculating the imaging range from the subject distance and the angle of view, and the process of calculating the amount of correction of the speed from the calculated imaging range and correcting the flight speed are performed by the unmanned aerial vehicle micom 30. In this case, the unmanned aerial vehicle micom 30 functions as an imaging range calculation part and a flight speed correction part. The imaging range calculation part acquires information of the current altitude as information of the subject distance and calculates the current imaging range based on the acquired information of the subject distance and the angle of view. The flight speed correction part corrects the flight speed based on the calculated imaging range. For example, the flight speed is corrected by the amount of correction corresponding to the amount of change of the imaging range.

The subject distance can be acquired from the captured image. That is, in a case where the focus position in a state where the in-focus image is captured is known, the subject distance can be acquired from information of the focus position. Thus, the subject distance can be acquired from the captured image. In the case of acquiring the subject distance from the captured image, for example, processing is performed as follows. First, image data of one scanning is acquired in a stage where one scanning is finished. Next, the acquired image data is analyzed, and the in-focus image is extracted. Next, the focus position in a state where the in-focus image is extracted is specified. Next, the subject distance is specified based on the specified focus position. By performing this process each time one scanning is completed, the subject distance can be sequentially detected.

The process of detecting the subject distance from the captured image may be performed by the camera 100 or may be performed by the unmanned aerial vehicle 10. In a case where the camera 100 performs the process, the camera micom 128 functions as a subject distance detection part. In a case where the unmanned aerial vehicle 10 performs the process, the unmanned aerial vehicle micom 30 functions as the subject distance detection part. In a case where the unmanned aerial vehicle micom 30 functions as the subject distance detection part, the image data is acquired from the camera 100 and processed.

<Form of Scanning>
<Waveform of Scanning>

In the embodiment, a configuration in which the focus position is periodically scanned by displacing the focus position in the sine wave shape is used. However, the form of scanning is not limited to the embodiment. Besides, for example, a configuration in which the focus position is periodically scanned by displacing the focus position in a sawtooth wave shape.

Figure 11:
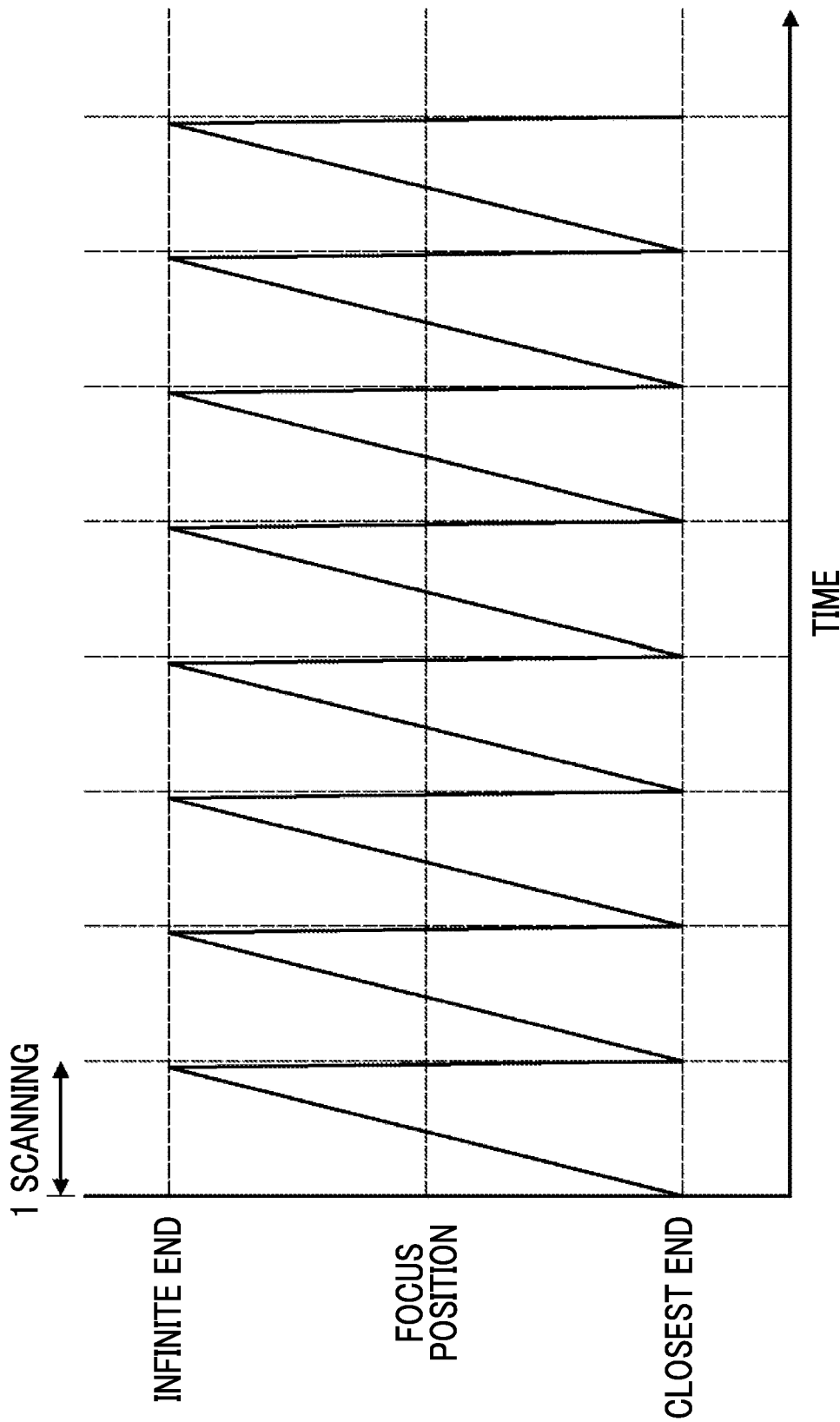
FIG. 11 is a conceptual diagram in a case where a focus position is periodically scanned by displacing the focus position in a sawtooth wave shape.

FIG. 11 is a conceptual diagram in a case where the focus position is periodically scanned by displacing the focus position in a sawtooth wave shape. In FIG. 11, a vertical axis denotes the focus position, and a horizontal axis denotes time.

As illustrated in FIG. 11, the focus position is periodically scanned by displacing the focus position in the sawtooth shape between the closest end and the infinite end.

<Form of Displacement of Focus Position>

While the focus position is continuously displaced in the embodiment, the focus position may be intermittently displaced. In this case, it is preferable to combine the cycle of displacement and the cycle of imaging. For example, in imaging of the motion image, the focus position is displaced in the same cycle as the frame rate. In imaging of a still image, the focus position is displaced at the same interval as an imaging interval of the still image.

In the case of intermittently displacing the focus position, it is preferable that the amount of displacement is set by considering the depth of field. Hereinafter, setting of the amount of displacement considering the depth of field will be described.

Figure 12:
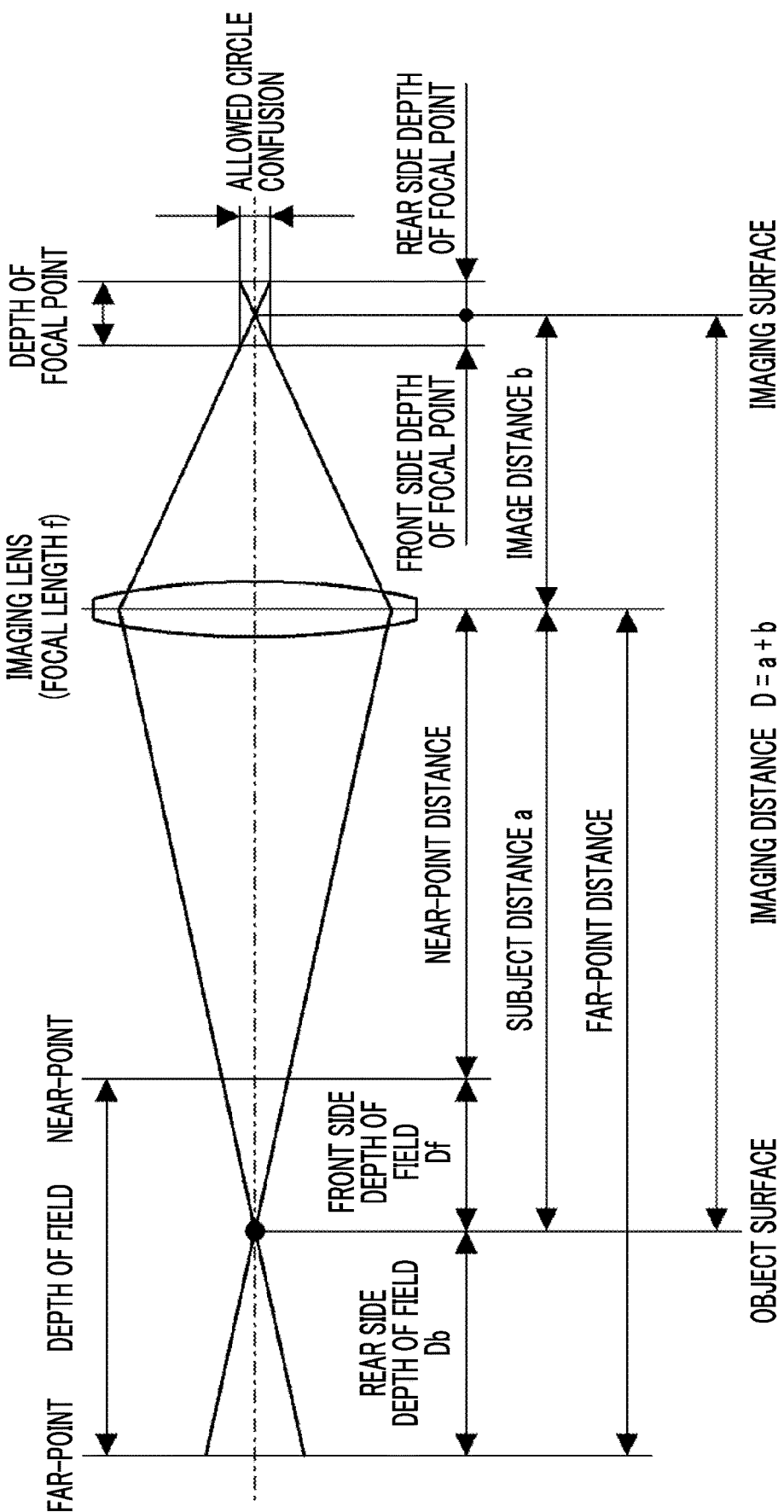
FIG. 12 is a descriptive diagram of a method of calculating a depth of field.

FIG. 12 is a descriptive diagram of a method of calculating the depth of field.

The depth of field is the range of a distance on the subject side that is seen as being in focus. In the imaging lens, a location that is in focus in a strict sense in certain one setting is present on only one plane. However, by allowing a constant allowance, a range in which a sufficiently clear image continues is present in front and rear of the location.

In a case where the depth of field on the front side is denoted by a front side depth of field Df, and the depth of field on the rear side is denoted by a rear side depth of field Db, the front side depth of field Df and the rear side depth of field Db are calculated by the following expression.

Front side depth of field $Df$=(diameter of allowed circle of confusion×subject distance$^2$)/(focal length$^2$+diameter of allowed circle confusion×$F$ number×subject distance)

Rear side depth of field $Db$=(diameter of allowed circle of confusion×subject distance$^2$)/(focal length$^2$−diameter of allowed circle confusion×$F$ number×subject distance)

As is apparent from the above expression, the depth of field is calculated using the diameter of the allowed circle of confusion, the F number, the subject distance, and the focal length as parameters.

The circle of confusion is a circular image in a state where a point is imaged by the imaging lens. Particularly, the minimum size of the image in which the image sensor cannot recognize the image due to blurriness is referred to as the allowed circle of confusion. The diameter of the allowed circle of confusion is determined by the pixel pitch of the image sensor or an optical image formation limit of a lens called an airy disk diameter. The larger of the pixel pitch or the airy disk diameter is the allowed circle of confusion.

A case of displacing the focus position of the imaging lens, that is, a case of changing the image distance from b to b+Δb, is considered. In this case, the subject distance in focus changes. That is, the subject distance in focus changes from a to a+Δa.

The amount of displacement (Δb) of the focus position is set such that the amount of change Δa of the subject distance in focus does not exceed the front side depth of field Df and the rear side depth of field Db.

By setting the amount of displacement of the focus position considering the depth of field and performing imaging in synchronization with displacement, an image that is always in focus in any frame can be captured.

<Example of Setting of Scanning>

A case where an in-focus image is captured in a range of ±50 mm while horizontally moving from a position shifted by 1000 mm from a target is considered.

Specifications of the camera are as follows.

Focal length of imaging lens: f=42 mm

F number of imaging lens: F=1.4

Pixel pitch of image sensor: 7.1 μm

Figure 13:
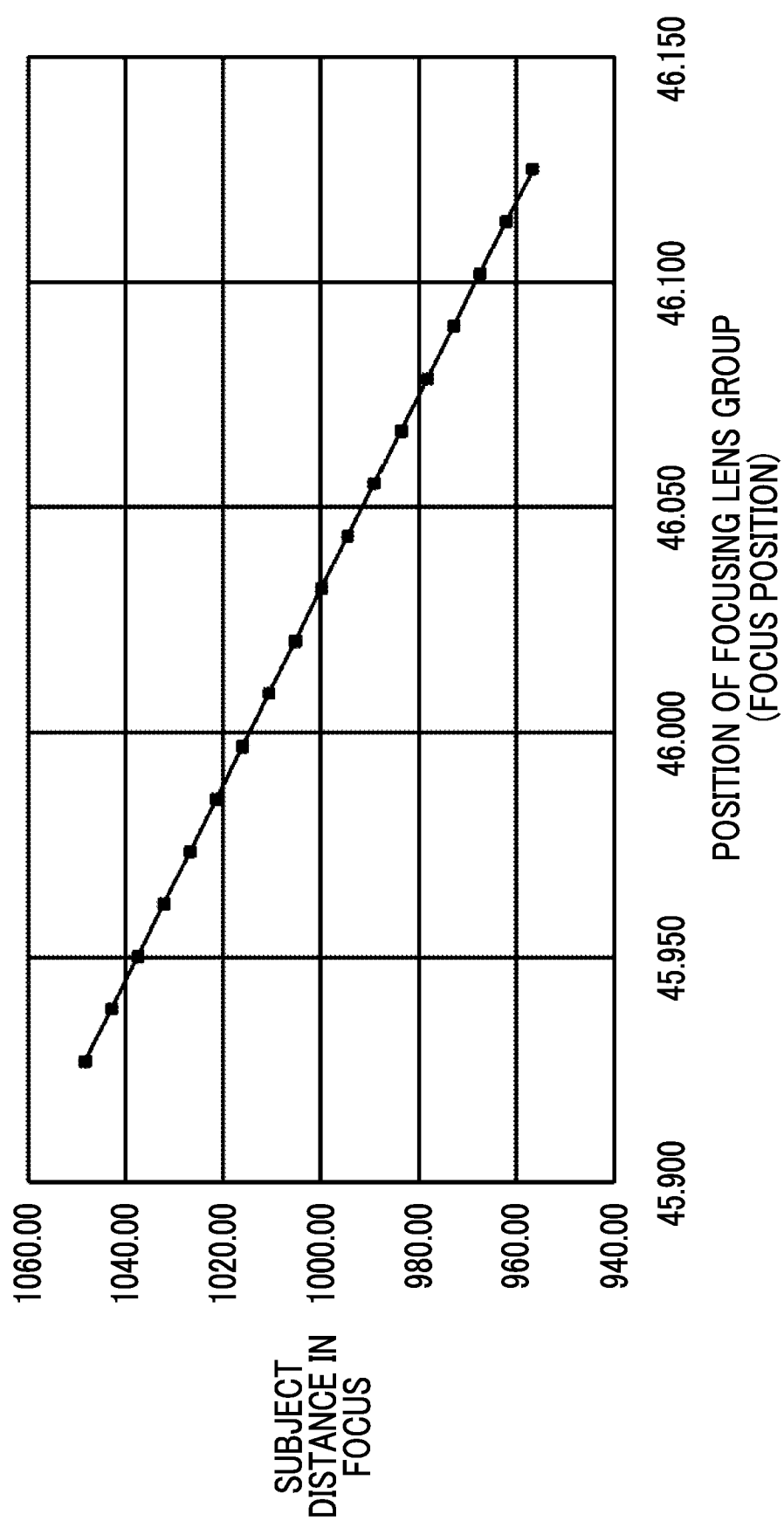
FIG. 13 is a graph illustrating a relationship between a focusing lens group and a subject distance in focus.

FIG. 13 is a graph illustrating a relationship between the position of the focusing lens group and the subject distance in focus.

As illustrated in FIG. 13, in capturing of the in-focus image in the range of ±50 mm, the focusing lens group may be displaced in a range of 46.1 mm to 45.9 mm from an imaging surface of the image sensor. The amount of displacement is set to an amount almost not exceeding the width of the depth of field.

In the case of scanning the focus position by displacing the focus position in the sine wave shape, imaging may be performed with one cycle as 52 or more frames. In other words, in a case where the frame rate on the camera side is 30 frames/second, imaging can be performed without causing a blank range in the depth of field in a case where one cycle of scanning is set to 52/30=1.73 seconds or longer.

In the case of scanning the focus position by displacing the focus position in the sawtooth wave shape, one imaging may be performed with 19 or more frames while scanning 46.1 to 45.9 mm at an equal speed. In other words, in a case where the frame rate on the camera side is 30 frames/second, imaging can be performed without causing a blank range in the depth of field in a case where one scanning is set to 19/30=0.63 seconds or longer.

<Flight of Unmanned Aerial Vehicle>

The unmanned aerial vehicle 10 may be configured to automatically fly along a predetermined route. In this case, the controller 12 is not necessary. The unmanned aerial vehicle 10 flies along the determined route while performing autonomous control based on information of various sensors. In this case, the flight speed is set under the above condition.

<Imaging by Camera>

In the embodiment, a configuration in which a motion image is continuously captured in response to the imaging instruction is used. Alternatively, a configuration in which still images are periodically imaged may be used. The "periodic imaging of still pictures" refers to repeated imaging of still pictures in a constant cycle between the imaging start instruction and the imaging finish instruction.

<Focusing Mechanism>

A configuration in which the focus position is displaced by moving a part of the lens groups constituting the imaging lens is used in the embodiment. However, the configuration of displacing the focus position, that is, the configuration of the focusing mechanism, is not limited to the embodiment. Besides, for example, a configuration in which the focus position is displaced by moving the whole imaging lens, that is, all of the lens groups, along the optical axis L can be used. In addition, a configuration in which the focus position is displaced by fixing the imaging lens and moving the image sensor forward and rearward along the optical axis can be used.

<Others>

The form of communication between the unmanned aerial vehicle 10 and the camera 100 is not particularly limited and may be a form of wireless communication.

♦♦Second Embodiment of Imaging Apparatus♦♦

[Apparatus Configuration of Imaging Apparatus]

An imaging apparatus of the present embodiment has a common point with the imaging apparatus of the first embodiment in that the imaging apparatus of the present embodiment is also configured to comprise an unmanned aerial vehicle and a camera mounted on the unmanned aerial vehicle. However, a configuration of the camera which is the imaging part is different. The camera of the imaging apparatus of the present embodiment is configured with a double lens camera that can capture two images of different angles of view at the same time on the same axis.

Configurations other than the camera are substantially the same as those of the imaging apparatus of the first embodiment. Thus, only the configuration of the camera will be described.

[Configuration of Camera]

Figure 14:
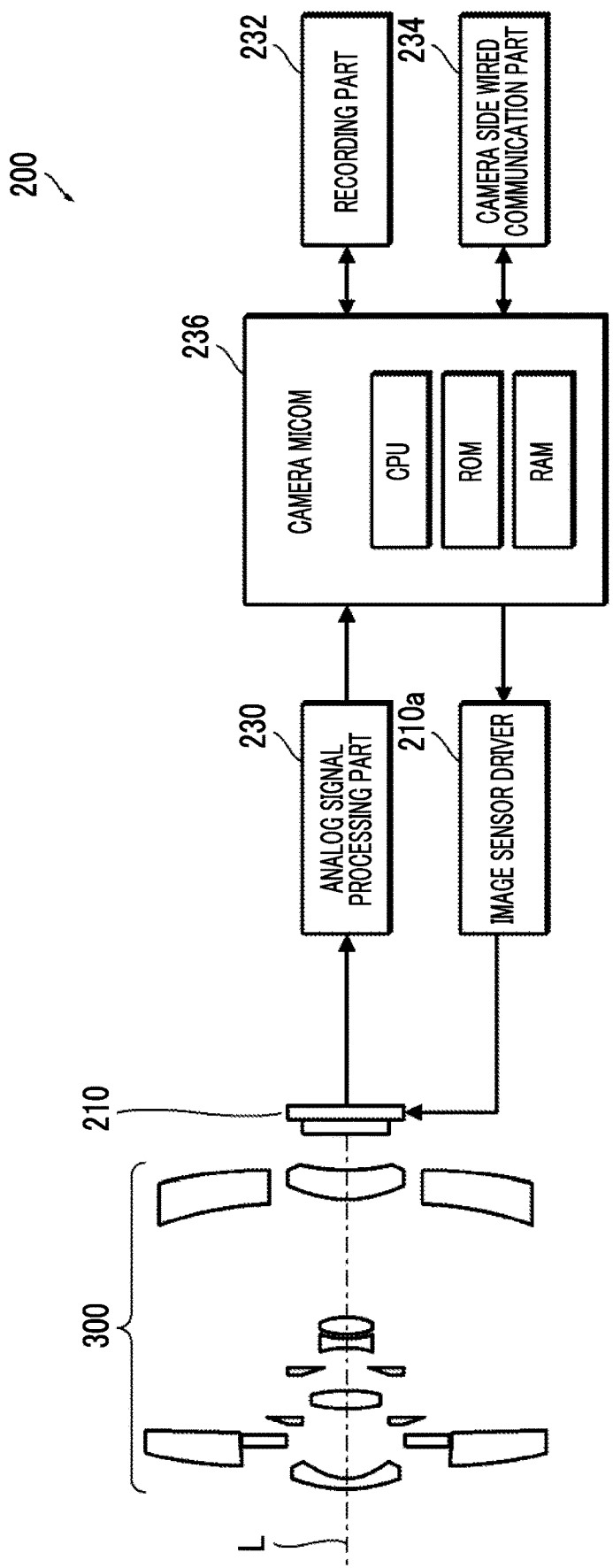
FIG. 14 is a block diagram illustrating a schematic configuration of the camera.

FIG. 14 is a block diagram illustrating a schematic configuration of the camera.

A camera 200 is one example of the imaging part. The camera 200 is configured to comprise an imaging lens 300, an image sensor 210, an analog signal processing part 230, a recording part 232, a camera side wired communication part 234, a camera micom 236, and the like.

<Imaging Lens>

Figure 15:
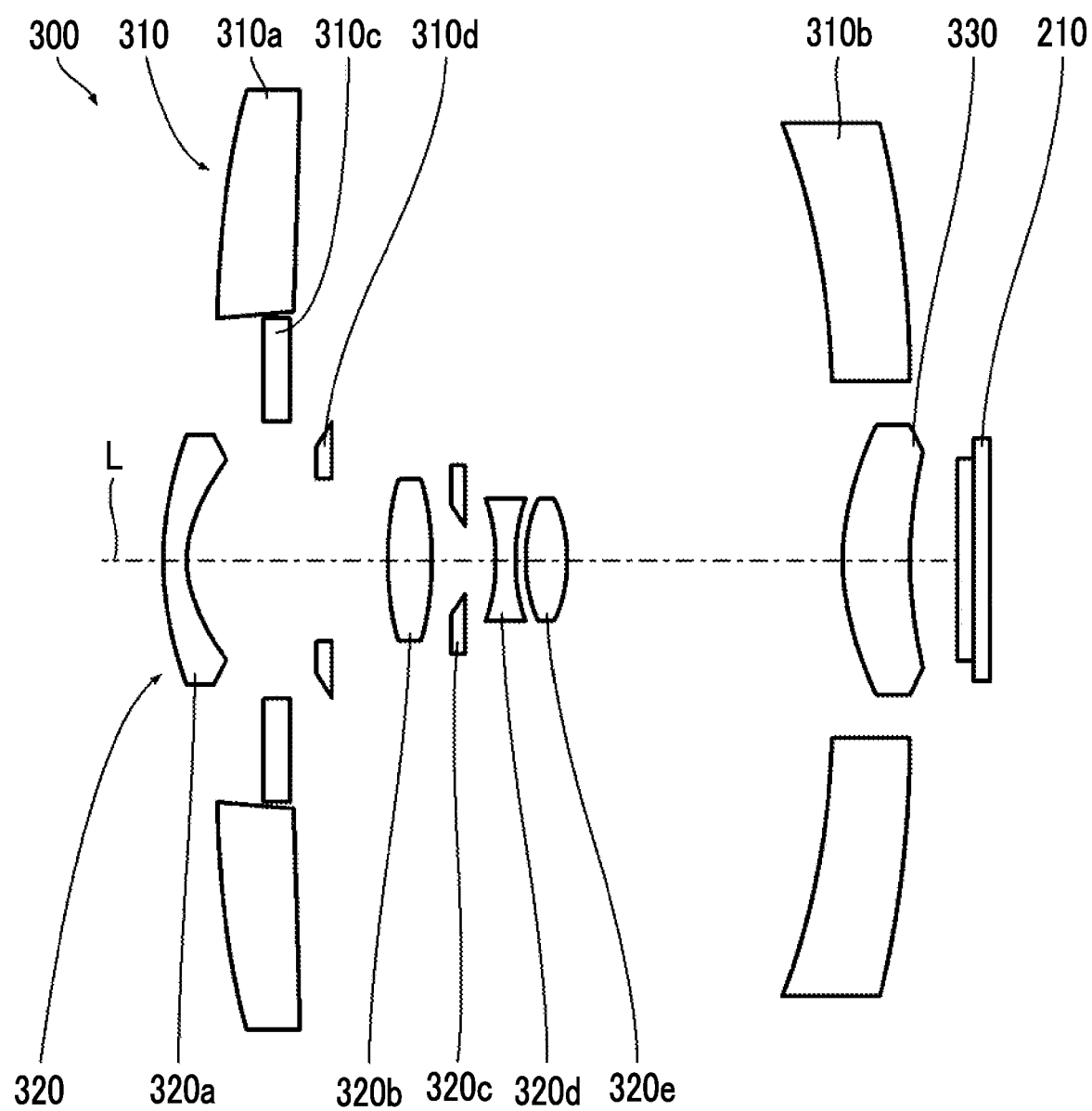
FIG. 15 is a schematic configuration diagram of an imaging lens.

FIG. 15 is a schematic configuration diagram of the imaging lens.

The imaging lens 300 captures two images of different angles of view at the same time. Thus, the imaging lens 300 includes two optical systems (a first optical system 310 and a second optical system 320). The first optical system 310 and the second optical system 320 perform imaging on the same axis and thus, have the same optical axis L. Particularly, in the imaging lens 300 of the present embodiment, the first optical system 310 and the second optical system 320 are arranged in a concentric shape. In addition, the first optical system 310 and the second optical system 320 have different focal lengths for capturing images of different angles of view. In the present embodiment, the first optical system 310 is configured with a telephoto optical system, and the second optical system 320 is configured with a wide angle optical system that has a shorter focal length than the first optical system 310.

<First Optical System>

The first optical system 310 is configured with a telephoto optical system. Particularly, in the present embodiment, the first optical system 310 is configured with a reflecting telephoto type optical system.

As illustrated in FIG. 15, the first optical system 310 is configured by arranging a first optical system first lens 310a, a first optical system first mirror 310b, a first optical system second mirror 310c, a first optical system stop 310d, and a common lens 330 in this order from the subject side. Each of the first optical system first lens 310a, the first optical system first mirror 310b, the first optical system second mirror 310c, and the first optical system stop 310d has a ring shape.

The first optical system first mirror 310b constitutes a primary mirror of the reflecting telephoto optical system and reflects light passing through the first optical system first lens 310a to the first optical system second mirror 310c.

The first optical system second mirror 310c constitutes a secondary mirror of the reflecting telephoto optical system and reflects light reflected by the first optical system first mirror 310b to the common lens 330.

The first optical system stop 310d adjusts the intensity of light incident on the common lens 330 from the first optical system second mirror 310c. The first optical system stop 310d is configured by combining a plurality of stop leaf blades in a ring shape and adjusts the intensity of light by increasing or decreasing the outer diameter of the ring shape.

The common lens 330 is the last lens. Light incident on the first optical system 310 exits from the common lens 330 and is incident on the image sensor 210. The common lens 330 is shared with the second optical system 320.

Figure 16:
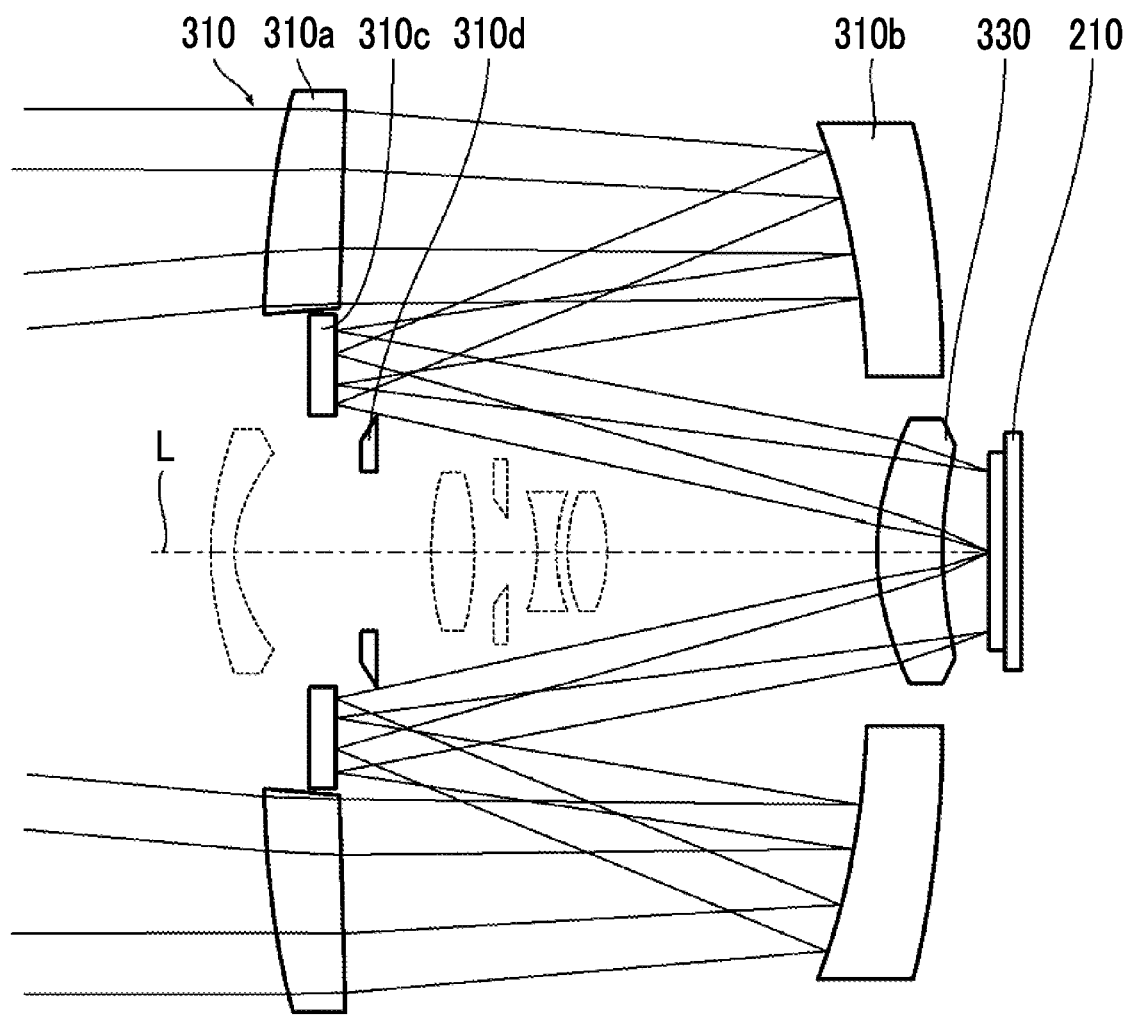
FIG. 16 is a diagram illustrating a ray trajectory of light passing through a first optical system.

FIG. 16 is a diagram illustrating a ray trajectory of light passing through the first optical system.

As illustrated in FIG. 16, light is incident on the image sensor 210 through the first optical system first lens 310a, the first optical system first mirror 310b, the first optical system second mirror 310c, the first optical system stop 310d, and the common lens 330.

<Second Optical System>

The second optical system 320 is configured with a wide angle optical system. Particularly, in the present embodiment, the second optical system 320 is configured with a fixed focal point optical system that enables pan-focus imaging.

As illustrated in FIG. 15, the second optical system 320 is configured by arranging a second optical system first lens 320a, a second optical system second lens 320b, a second optical system stop 320c, a second optical system third lens 320d, a second optical system fourth lens 320e, and the common lens 330 in this order from the subject side. Each optical element is arranged on the same axis in the inner circumferential portion of the first optical system 310. Since the second optical system 320 has a fixed focal point, each optical element (including the common lens 330) is fixedly arranged at a constant position. The second optical system stop 320c is also configured with a fixed stop and is fixedly arranged at a constant position.

Figure 17:
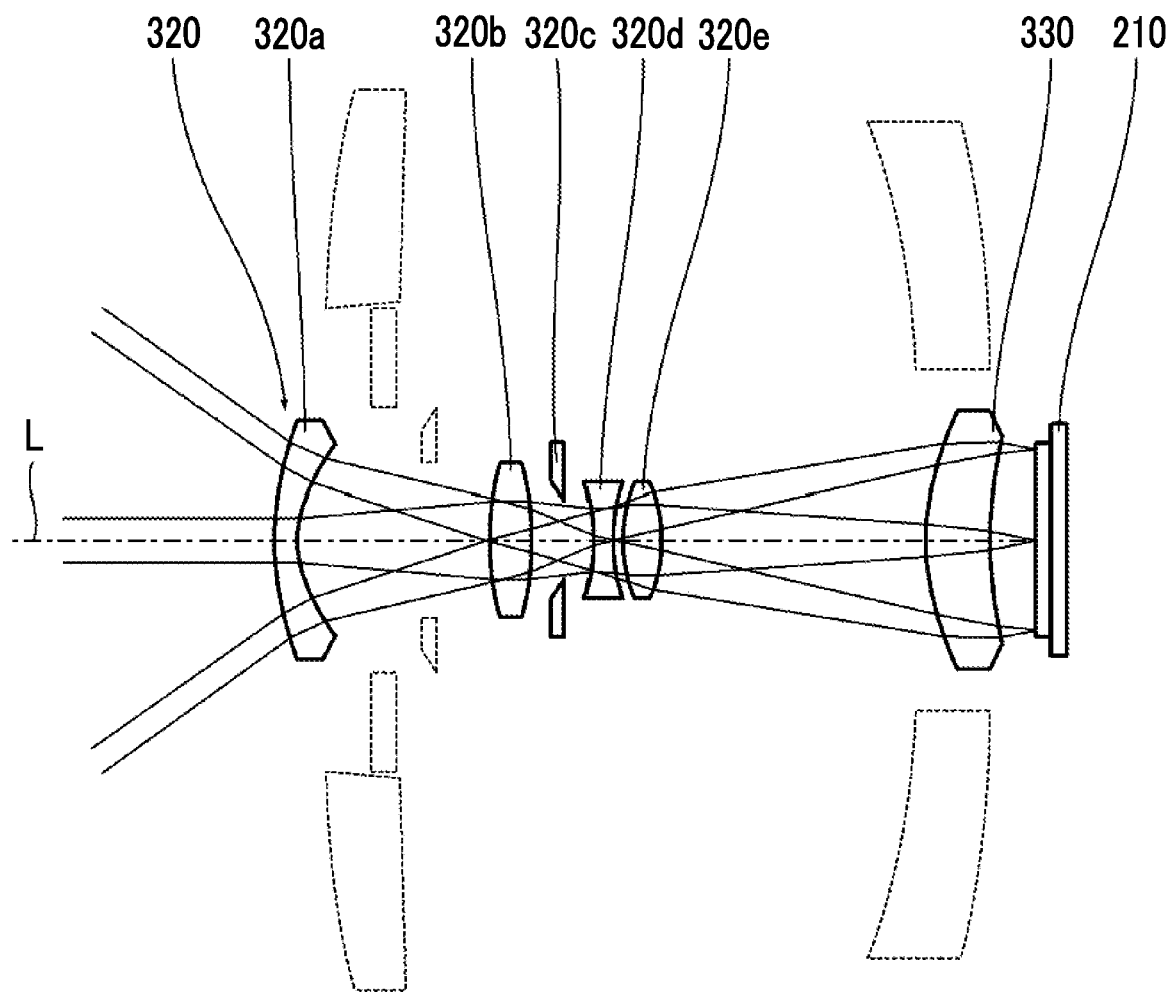
FIG. 17 is a diagram illustrating a ray trajectory of light passing through a second optical system.

FIG. 17 is a diagram illustrating a ray trajectory of light passing through the second optical system.

Light is incident on the image sensor 210 through the second optical system first lens 320a, the second optical system second lens 320b, the second optical system stop 320c, the second optical system third lens 320d, the second optical system fourth lens 320e, and the common lens 330.

<Drive System of Imaging Lens>

Figure 18:
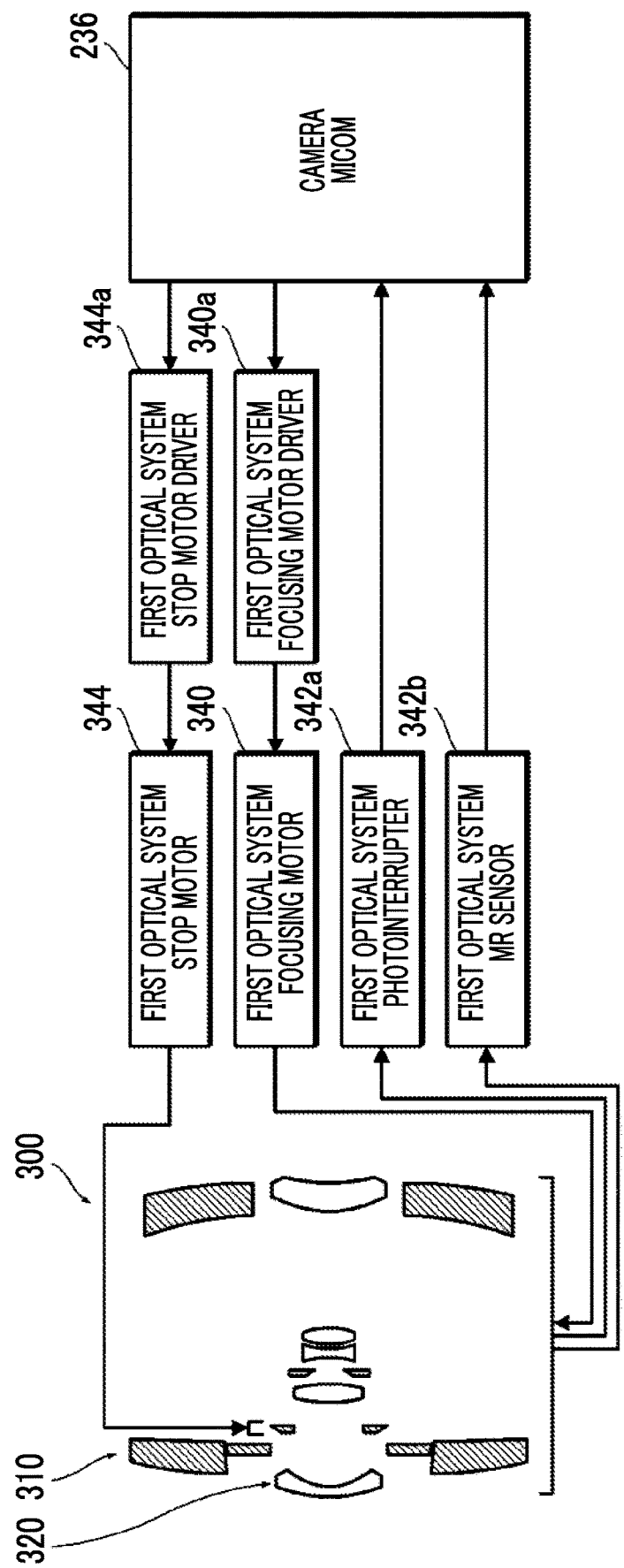
FIG. 18 is a block diagram illustrating a schematic configuration of a drive system of the imaging lens.

FIG. 18 is a block diagram illustrating a schematic configuration of a drive system of the imaging lens.

As described above, the second optical system 320 has a fixed focal point and a fixed stop. Thus, the drive system is comprised for only the first optical system 310.

The first optical system 310 comprises a first optical system focusing mechanism as a mechanism for adjusting the focus position.

The first optical system focusing mechanism displaces the focus position by moving a part of the optical elements of the first optical system 310 forward and rearward along a shaft.

Figure 19A:
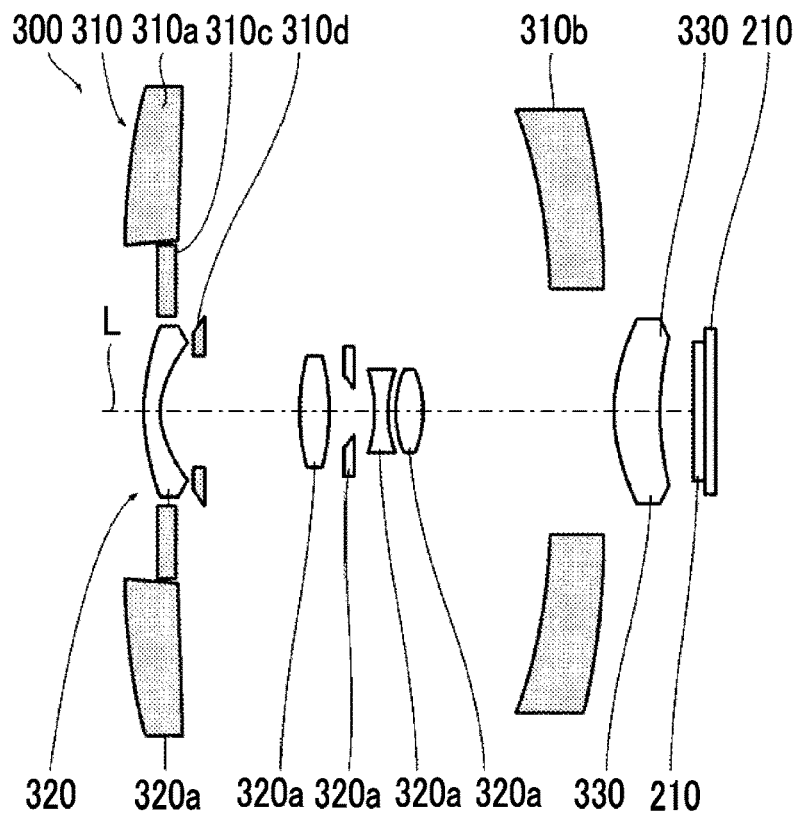
FIGS. 19A and 19B are operation description diagrams of the first optical system driven by a first optical system focusing mechanism.
Figure 19B:
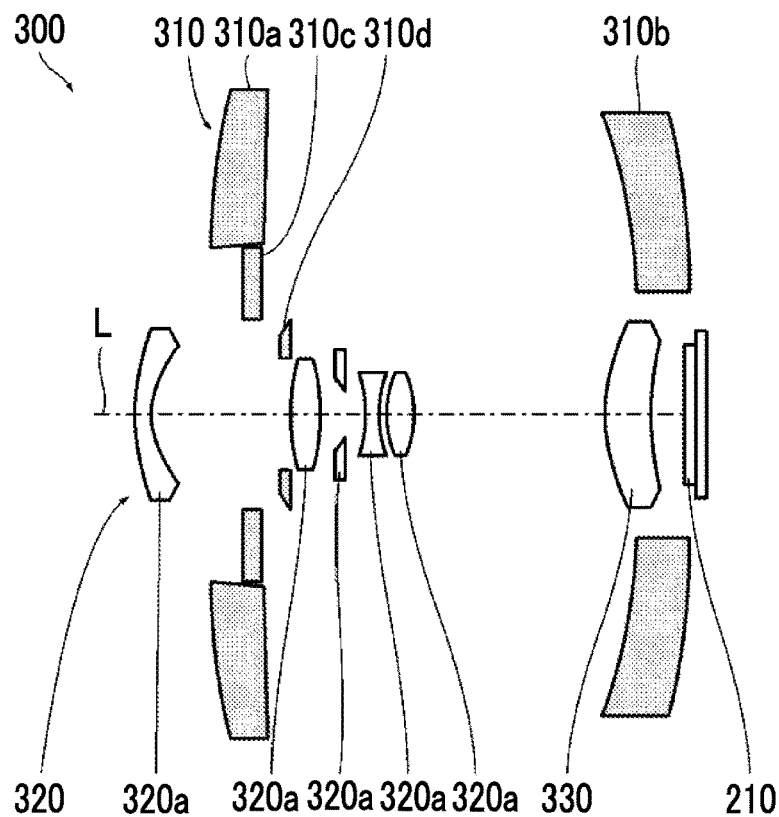

FIGS. 19A and 19B are operation description diagrams of the first optical system driven by the first optical system focusing mechanism. FIG. 19A illustrates a state where a movable portion is moved to the subject side. FIG. 19B illustrates a state where the movable portion is moved to an image plane side.

As illustrated in FIGS. 19A and 19B, the first optical system focusing mechanism displaces the focus position by moving the first optical system first lens 310a, the first optical system first mirror 310b, the first optical system second mirror 310c, and the first optical system stop 310d constituting the first optical system 310 together.

The first optical system focusing mechanism is configured to comprise a support part (not illustrated) that supports the first optical system first lens 310a, the first optical system first mirror 310b, the first optical system second mirror 310c, and the first optical system stop 310d (hereinafter, referred to as a "first optical system movable portion") to be movable together along the shaft, and a first optical system focusing motor 340 that moves the first optical system movable portion along the shaft. For example, the first optical system focusing motor 340 is configured with a linear motor. The camera micom 236 controls driving of the first optical system focusing motor 340 through a first optical system focusing motor driver 340a.

The first optical system 310 comprises a first optical system photointerrupter 342a and a first optical system MR sensor 342b as means for detecting the position of the first optical system movable portion. The first optical system photointerrupter 342a detects a state where the first optical system movable portion is positioned at a predetermined origin. The first optical system MR sensor 342b detects the amount of displacement of the first optical system movable portion. The first optical system photointerrupter 342a detects a state where the first optical system movable portion is positioned at the origin, and the first optical system MR sensor 342b detects the amount of displacement from the origin. Thus, the position of the first optical system movable portion with respect to the origin can be detected. The detection results of the first optical system photointerrupter 342a and the first optical system MR sensor 342b are output to the camera micom 236. The camera micom 236 detects the position of the first optical system movable portion based on the outputs of the first optical system photointerrupter 342a and the first optical system MR sensor 342b.

The first optical system stop 310d is driven by a first optical system stop motor 344. The camera micom 236 controls driving of the first optical system stop motor 344 through a first optical system stop driver 344a.

<Image Sensor>

The image sensor 210 is configured with a directional sensor in which pixels that selective receive light passing through the first optical system 310 and light passing through the second optical system 320 are arranged in a matrix shape.

Figure 20:
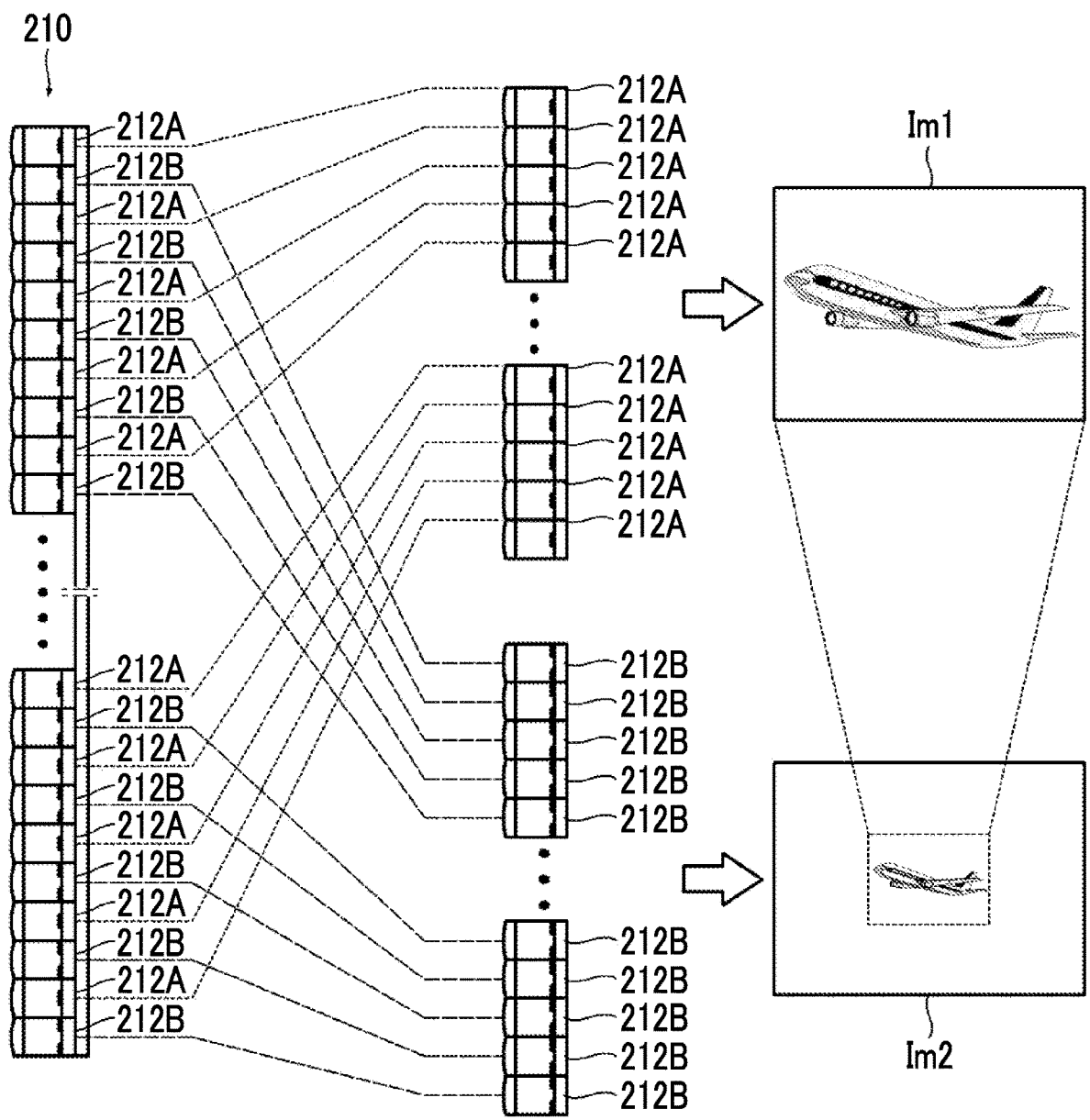
FIG. 20 is a schematic configuration diagram of an image sensor.

FIG. 20 is a schematic configuration diagram of the image sensor.

As illustrated in FIG. 20, the image sensor 210 includes first pixels 212A that selectively receive light passing through the first optical system 310, and second pixels 212B that selectively receive light passing through the second optical system 320. The first pixels 212A and the second pixels 212B are alternately arranged on the same flat surface.

Figure 21:
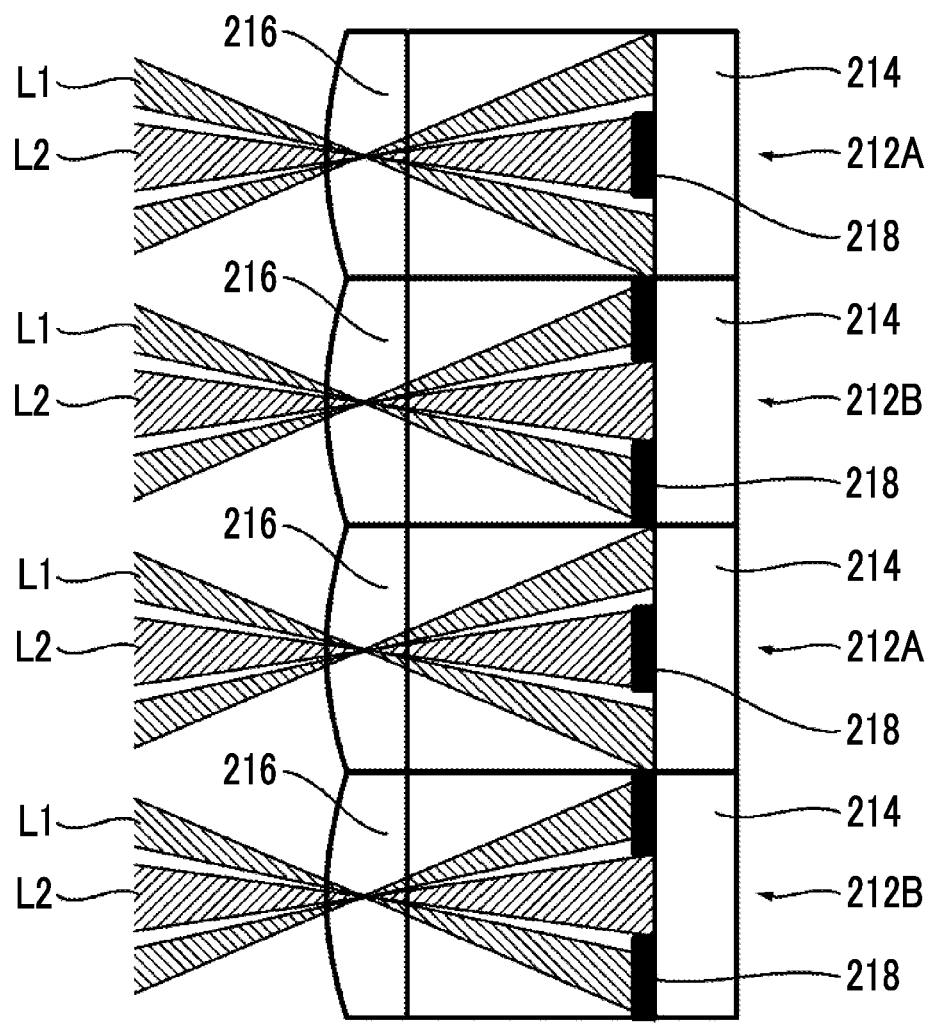
FIG. 21 is a conceptual diagram of a configuration in which each pixel of the image sensor selectively receives light from a corresponding optical system.

FIG. 21 is a conceptual diagram of a configuration in which each pixel of the image sensor selectively receives light from a corresponding optical system.

As illustrated in FIG. 21, each pixel is configured to comprise a photodiode 214, a microlens 216, and a light blocking mask 218.

The microlens 216 is arranged in front of the photodiode 214. The microlens 216 forms pupil images of the first optical system 310 and the second optical system 320 in the photodiode 214.

The light blocking mask 218 is arranged between the microlens 216 and the photodiode 214. The light blocking mask 218 blocks a part of light passing through the microlens 216. The light blocking mask 218 of the first pixel 212A has a shape that blocks light L2 passing through the second optical system 320. Specifically, the light blocking mask 218 has a circular shape. The light blocking mask 218 of the second pixel 212B has a shape that blocks light L1 passing through the first optical system 310. Specifically, the light blocking mask 218 has a ring shape.

In the above configuration, the first pixel 212A selectively receives the light L1 passing through the first optical system 310, and the second pixel 212B selectively receives the light L2 passing through the second optical system 320. Accordingly, by acquiring an image signal of the first pixel 212A, an image signal of an image Im1 acquired through the first optical system 310 can be acquired. By acquiring an image signal of the second pixel 212B, an image signal of an image Im2 acquired through the second optical system 320 can be acquired.

In the imaging lens 300 of the present embodiment, the first optical system 310 is configured with a telephoto optical system, and the second optical system 320 is configured with a wide angle optical system. Accordingly, an image Im1 of the first optical system 310 is a telephoto image, and an image Im2 of the second optical system 320 is a wide angle image. In addition, since the image of each optical system is captured on the same axis, the image Im1 of the first optical system 310 is an image of an enlarged central part of the image Im2 of the second optical system 320 and is an image not having parallax.

In the case of acquiring a color image, a color filter is comprised in the first pixel 212A and the second pixel 212B. The color filter is arranged in a predetermined arrangement. For example, color filters of three colors including red (R), green (G), and blue (B) are arranged in a Bayer arrangement. Accordingly, a color image can be acquired.

<Analog Signal Processing Part>

The analog signal processing part 230 acquires the analog image signal of each pixel output from the image sensor 210, performs predetermined signal processing on the analog image signal, then converts the analog image signal into the digital signal, and outputs the digital signal. The digital image signal output from the analog signal processing part 230 is acquired by the camera micom 236.

<Recording Part>

The recording part 232 is a recording part of various data. Captured image data is recorded in the recording part 232. The camera 200 of the present embodiment captures two images at the same time in one imaging. Thus, two images are recorded in one imaging. Specifically, image data captured by the first optical system 310 and image data captured by the second optical system 320 are recorded.

<Camera Side Wired Communication Part>

The camera side wired communication part 234 communicates with the unmanned aerial vehicle 10 in a wired manner and transmits and receives various signals with the unmanned aerial vehicle 10 under control of the camera micom 236.

<Camera Micom>

The camera micom 236 is a control part that controls the operation of the whole camera 200. The camera micom 236 comprises a CPU, a ROM, and a RAM and implements various functions by executing a predetermined program. The program is stored in the ROM.

Figure 22:
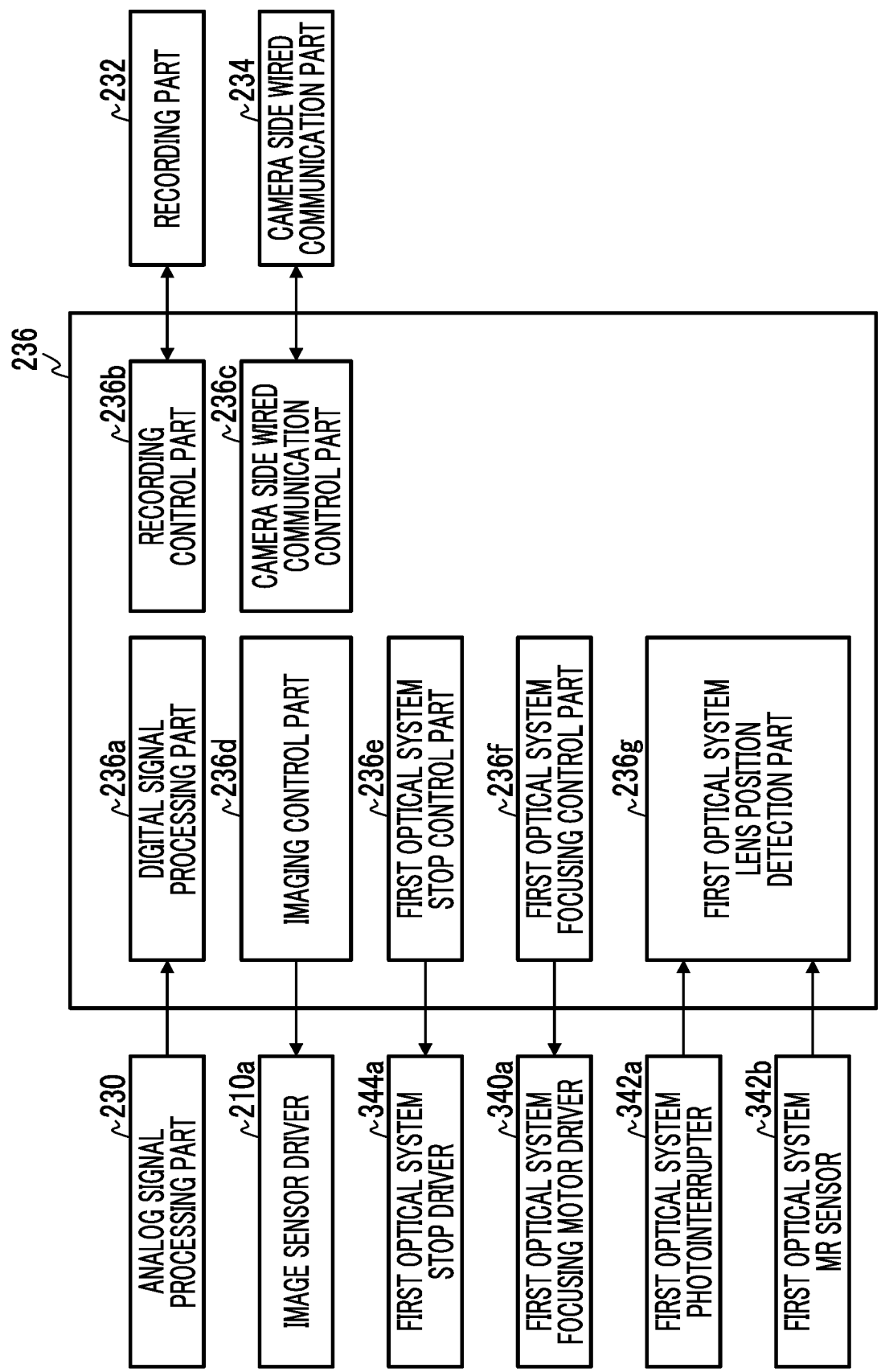
FIG. 22 is a block diagram of main functions implemented by the camera micom.

FIG. 22 is a block diagram of main functions implemented by the camera micom.

As illustrated in FIG. 22, the camera micom 236 functions as a digital signal processing part 236a, a recording control part 236b, a camera side wired communication control part 236c, an imaging control part 236d, a first optical system stop control part 236e, a first optical system focusing control part 236f, a first optical system lens position detection part 236g, and the like by executing the predetermined program.

The digital signal processing part 236a acquires the analog image signal output from the analog signal processing part 230 and generates image data by performing predetermined signal processing on the analog image signal. The digital signal processing part 236a generates first image data based on the image signal of the first pixel 212A of the image sensor 210 and generates second image data based on the image signal of the second pixel 212B. The first image data is image data of a first image captured through the first optical system 310, and the second image data is image data of a second image captured through the second optical system 320.

The recording control part 236b controls writing of data into the recording part 232. The image data (the first image data and the second image data) acquired by imaging is recorded in the recording part 232 by the recording control part 236b.

The camera side wired communication control part 236c controls communication with the unmanned aerial vehicle 10 through the camera side wired communication part 234.

The imaging control part 236d controls driving of the image sensor 210 through an image sensor driver 210a. More specifically, driving of the image sensor 210 is controlled such that a motion image is captured at a predetermined frame rate.

The first optical system stop control part 236e controls driving of the first optical system stop motor 344 through the first optical system stop driver 344a.

The first optical system focusing control part 236f controls driving of the first optical system focusing motor 340 through the first optical system focusing motor driver 340a. Specifically, driving of the first optical system focusing motor 340 is controlled such that the focus position of the first optical system 310 is periodically scanned. In the camera 200 of the present embodiment, the focus position of the first optical system 310 is periodically scanned by displacing the focus position in the sine wave shape between the closest end and the infinite end (refer to FIG. 7).

The first optical system lens position detection part 236g detects the position of the first optical system movable portion based on the outputs of the first optical system photointerrupter 342a and the first optical system MR sensor 342b.

The first optical system focusing control part 236f controls driving of the first optical system focusing motor 340 and periodically scans the focus position based on the position of the first optical system movable portion.

[Effect of Imaging Apparatus]

<Basic Operation>

<Basic Operation of Unmanned Aerial Vehicle>

The unmanned aerial vehicle 10 flies in the air based on the operation of the controller 12. Specifically, the unmanned aerial vehicle 10 moves upward in response to the upward movement instruction and moves downward in response to the downward movement instruction from the controller 12. In addition, the unmanned aerial vehicle 10 revolves to the direction of the instruction in response to the revolution instruction.

<Basic Operation of Camera>

The camera 200 also performs imaging based on the operation of the controller 12. That is, capturing of a motion image is started in response to the imaging start instruction from the controller 12. Capturing of the motion image is finished in response to the imaging finish instruction from the controller 12. The motion image is continuously captured from the start of imaging until the imaging finish instruction is provided.

In the camera 200 of the present embodiment, the motion image of the first optical system 310 and the motion image of the second optical system 320 are captured at the same time on the same axis. The motion image of the first optical system 310 is a telephoto motion image, and the motion image of the second optical system 320 is a wide angle motion image. Both motion images are motion images not having parallax. The motion image captured by the first optical system 310 and the motion image captured by the second optical system 320 are recorded in the recording part 232.

The focus position of the first optical system 310 is periodically scanned during imaging. That is, the focus position is periodically scanned by displacing the focus position in the sine wave shape between the closest end and the infinite end. Accordingly, for the first optical system 310, an image of at least one frame in focus can be captured for each scanning.

Imaging performed by the second optical system 320 is imaging with a fixed focal point and is pan-focus imaging.

<Operation of Unmanned Aerial Vehicle During Imaging>

During imaging, the unmanned aerial vehicle 10 flies at an almost constant altitude. Accordingly, only revolution can be the operation during imaging.

The unmanned aerial vehicle micom 30 functioning as the movement control part 30a controls each propeller drive motor 20 and flies at an almost constant altitude based on the output from the sensor part 24.

In addition, during imaging, the unmanned aerial vehicle 10 flies at a speed that is controlled as follows. That is, the flight speed is controlled such that at least one scanning is performed during movement to a position shifted by an imaging range of the first optical system 310.

Figure 23:
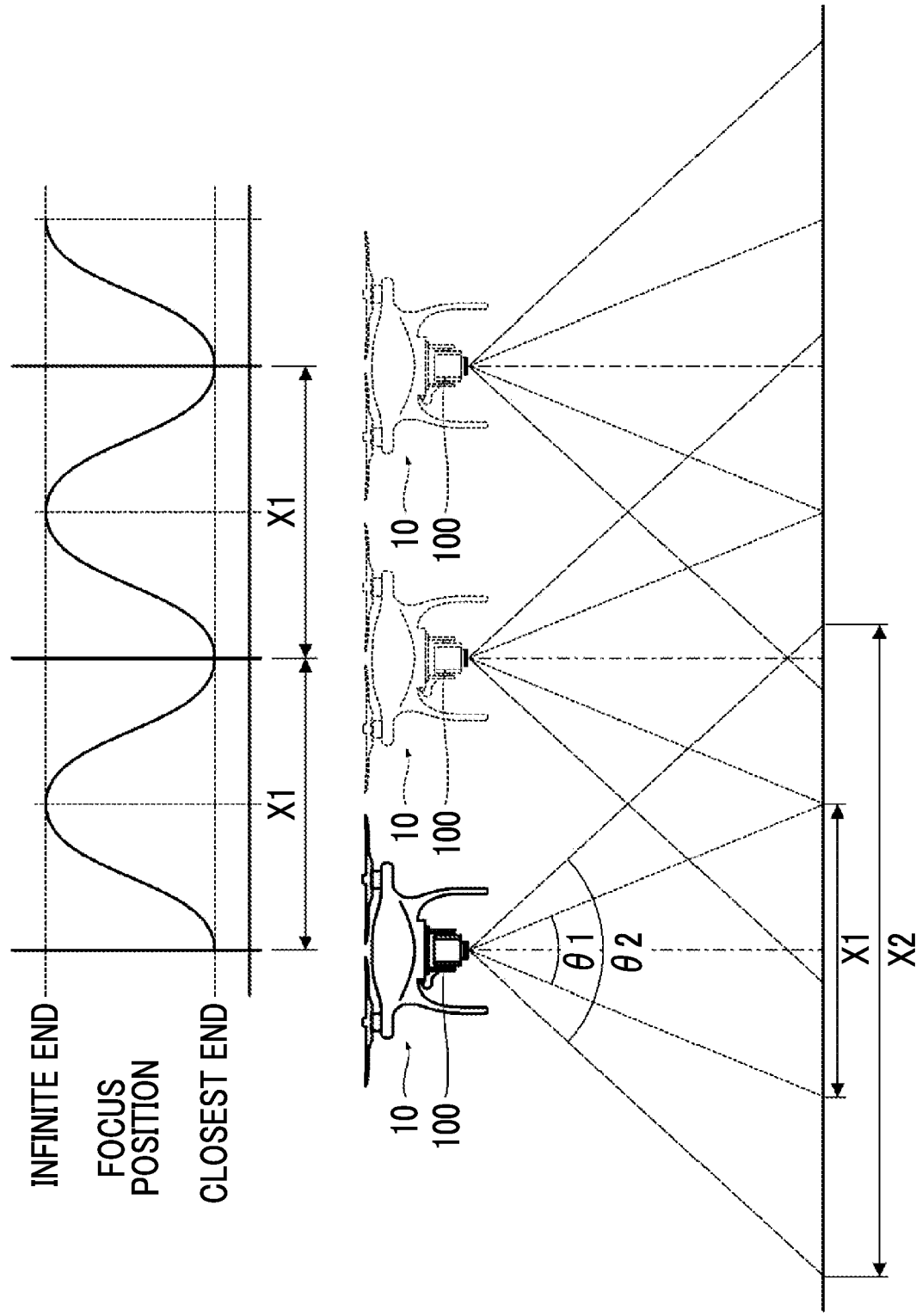
FIG. 23 is a conceptual diagram of setting of the flight speed of the unmanned aerial vehicle during imaging.

FIG. 23 is a conceptual diagram of setting of the flight speed of the unmanned aerial vehicle during imaging.

A case of imaging a space immediately below the camera 200 from a constant altitude is considered. In this case, a range of an angle of view θ1 is imaged by the first optical system 310, and a range of an angle of view θ2 is imaged by the second optical system 320.

The width of the imaging range of the first optical system 310 and the width of the imaging range of the second optical system 320 in the movement direction of the unmanned aerial vehicle 10 are denoted by X1 and X2. In this case, the unmanned aerial vehicle 10 is set to a speed at which at least one scanning is performed during movement by the distance X1.

FIG. 23 illustrates an example of a case of setting a speed at which scanning is performed twice during movement by the distance X1. In this case, in a case where a time period required for one scanning is denoted by T, a speed V of the unmanned aerial vehicle 10 is set as V=X/2T. The unmanned aerial vehicle micom 30 of the unmanned aerial vehicle 10 functioning as the movement control part 30a controls driving of each propeller drive motor 20 to move at the set speed during imaging.

<Processing of Captured Image>

The motion image captured by the first optical system 310 and the motion image captured by the second optical system 320 are recorded in the recording part 232. Of these motion images, the motion image captured by the first optical system 310 is a motion image in which the focus position periodically changes. The focus position is displaced from the position of the closest end to the position of the infinite end in one scanning. Accordingly, an image of at least one frame in focus can be acquired by one scanning.

For the motion image captured by the first optical system 310, an in-focus image can be extracted in units of scanning by analyzing the motion image in units of scanning and extracting an image of a frame having the highest sharpness.

For the motion image captured by the second optical system 320, an image of a frame corresponding to the in-focus image is extracted. That is, an image of a frame that is captured at the same timing as the frame extracted as the in-focus image is extracted.

This in-focus image extraction process may be performed by the camera 200 or may be performed by a dedicated image processing apparatus.

In the case of performing the process by the camera 200, the camera micom 236 implements a function of performing the process. In this case, the camera micom 236 functions as an in-focus image extraction part by executing the predetermined program and executes the process. The extraction of the in-focus image may be performed in real time or may be collectively performed after the end of imaging. In the case of performing the extraction in real time, an in-focus image extraction process is performed each time scanning is finished.

In the case of performing the extraction by the dedicated image processing apparatus, for example, a computer functions as the image processing apparatus. That is, the computer functions as an apparatus performing the above process by executing a predetermined program.

[Modification Example]

<Setting of Speed of Unmanned Aerial Vehicle>

As described above, the speed of the unmanned aerial vehicle 10 during imaging is set to the speed at which at least one scanning is performed during movement to the position shifted by the imaging range of the first optical system 310. Accordingly, an in-focus image having an overlapping part can be captured in both of the first optical system 310 and the second optical system 320.

In a case where the efficiency of imaging is considered, it is preferable that the speed of the unmanned aerial vehicle 10 during imaging is set to a speed at which one scanning is completed at the same time as movement to the position shifted by the imaging range of the first optical system 310. Accordingly, a desired range can be imaged in a short time period.

Figure 24:
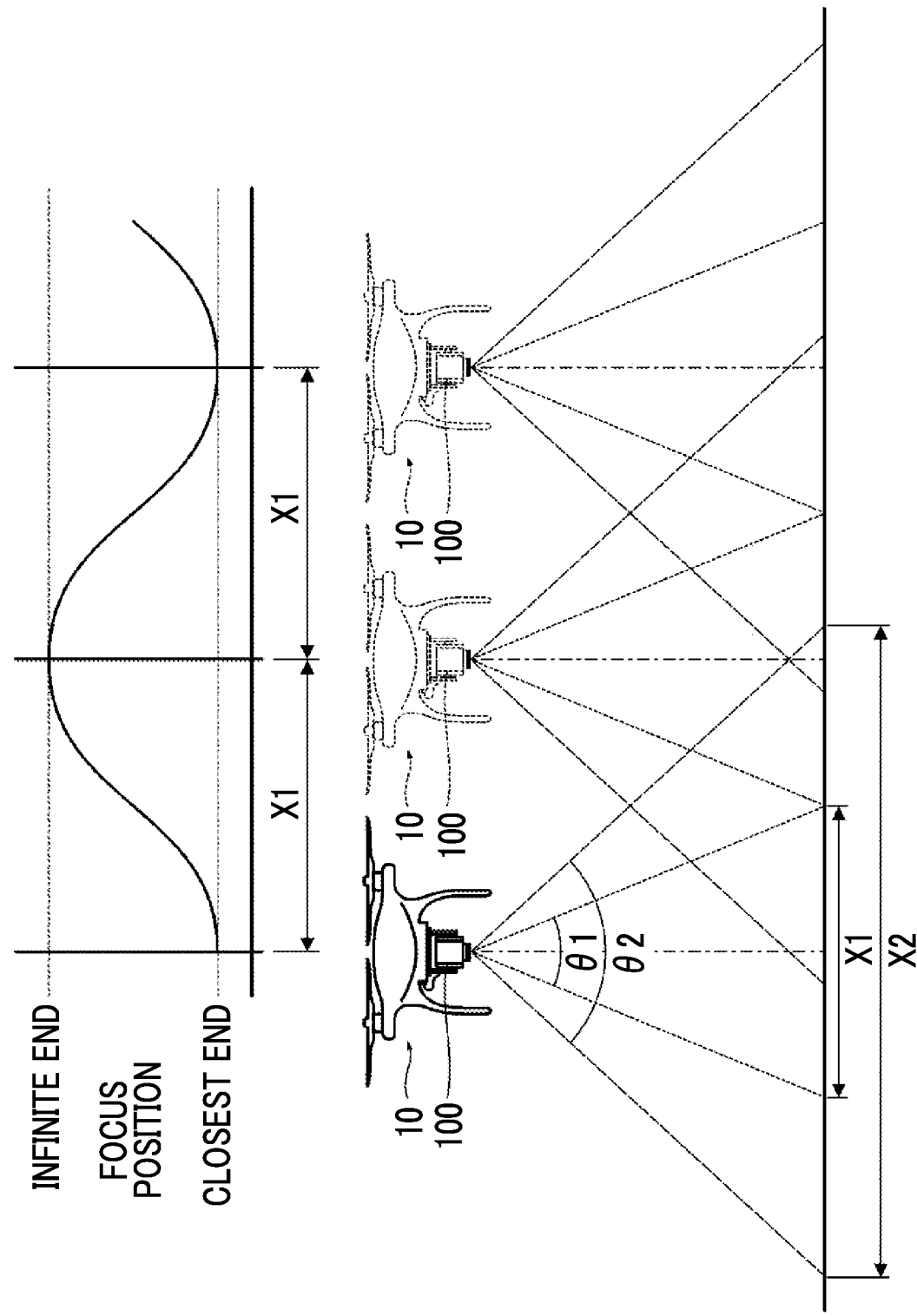
FIG. 24 is a conceptual diagram of setting of the flight speed of the unmanned aerial vehicle in the case of completing movement at the same time as scanning.

FIG. 24 is a conceptual diagram of setting of the flight speed of the unmanned aerial vehicle in the case of completing movement at the same time as scanning.

In a case where the width of the imaging range of the first optical system 310 in the movement direction of the unmanned aerial vehicle 10 is denoted by X1, the speed of the unmanned aerial vehicle 10 is set such that one scanning is completed at the same time as the movement of the unmanned aerial vehicle 10 by the distance X1. In this case, in a case where the time period for one scanning is denoted by T, the speed V of the unmanned aerial vehicle 10 is set as V=X1/T.

The "same time" does not require strict simultaneity and includes a range that is regarded as being almost the same time. Accordingly, a slight deviation is allowed. The speed of the unmanned aerial vehicle 10 may be set to the speed at which one scanning is completed at almost the same timing as movement to the position shifted by the imaging range.

In actuality, it is necessary to consider overlapping. Thus, the unmanned aerial vehicle 10 is set to a speed at which one scanning is completed slightly faster than movement to the position shifted by the imaging range of the first optical system 310.

The width X1 of the imaging range of the first optical system 310 in the movement direction of the unmanned aerial vehicle 10 changes depending on the movement direction of the unmanned aerial vehicle 10. Accordingly, in the case of performing imaging while turning to any direction, it is preferable to correct the speed depending on the movement direction of the unmanned aerial vehicle 10.

The imaging range also changes in a case where the direction (imaging direction) of the camera 200 is changed. Thus, it is further preferable to correct the speed depending on the direction of the camera 200.

In the case of performing imaging while flying at a constant speed, a speed at which at least one scanning is performed during movement to a position shifted by the width of the imaging range of the first optical system 310 in a short direction of the imaging range of the first optical system 310 is set. Accordingly, even in the case of performing imaging while flying in any direction, the overlapping in-focus image can be captured in both of the first optical system 310 and the second optical system 320. In this case, the maximum speed is a speed at which one scanning is completed at the same time as movement to the position shifted by the width of the imaging range of the first optical system 310 in the short direction of the imaging range of the first optical system 310.

<Adjustment of Flight Speed>

In a case where the unmanned aerial vehicle 10 comprises altitude measurement means such as an altitude sensor, it is preferable to acquire information of the altitude from the altitude measurement means and adjust the flight speed. That is, it is preferable to correct the speed of the unmanned aerial vehicle 10 by estimating the subject distance from the altitude and calculating the current imaging range from the estimated subject distance and the angle of view.

For example, the process of calculating the imaging range from the subject distance and the angle of view, and the process of calculating the amount of correction of the speed from the calculated imaging range and correcting the flight speed are performed by the unmanned aerial vehicle micom 30. In this case, the unmanned aerial vehicle micom 30 functions as an imaging range calculation part and a flight speed correction part. The imaging range calculation part acquires information of the current altitude as information of the subject distance and calculates the current imaging range based on the acquired information of the subject distance and the angle of view. The flight speed correction part corrects the flight speed based on the calculated imaging range. For example, the flight speed is corrected by the amount of correction corresponding to the amount of change of the imaging range.

As described above, the subject distance can be acquired from the captured image. The process of detecting the subject distance from the captured image may be performed by the camera 200 or may be performed by the unmanned aerial vehicle 10. In a case where the camera 200 performs the process, the camera micom 236 functions as the subject distance detection part. In a case where the unmanned aerial vehicle 10 performs the process, the unmanned aerial vehicle micom 30 functions as the subject distance detection part. In a case where the unmanned aerial vehicle micom 30 functions as the subject distance detection part, the image data is acquired from the camera 200 and processed.

<Form of Scanning>

In the embodiment, a configuration in which the focus position is periodically scanned by displacing the focus position in the sine wave shape is used. However, the form of scanning is not limited to the embodiment. Besides, for example, a configuration in which the focus position is periodically scanned by displacing the focus position in a sawtooth wave shape may be used (refer to FIG. 11).

In addition, the focus position may be intermittently displaced. In this case, it is preferable to combine the cycle of displacement and the cycle of imaging.

<Flight of Unmanned Aerial Vehicle>

The unmanned aerial vehicle 10 may be configured to automatically fly along a predetermined route. In this case, the controller 12 is not necessary. The unmanned aerial vehicle 10 flies along the determined route while performing autonomous control based on information of various sensors. In this case, the flight speed is set under the above condition.

<Imaging by Camera>

In the embodiment, a configuration in which a motion image is continuously captured in response to the imaging instruction is used. Alternatively, a configuration in which still images are periodically imaged may be used.

<Focusing Mechanism of Second Optical System>

In the embodiment, the second optical system 320 is a fixed focal point optical system. Alternatively, a focusing mechanism (second optical system focusing mechanism) may also be comprised for the second optical system 320. For example, the second optical system focusing mechanism displaces the focus position of the second optical system 320 by moving a part or all of the lens groups constituting the second optical system 320.

In a case where the focusing mechanism is comprised in the second optical system 320, the second optical system 320 may have an autofocus function. In this case, a detection part (second optical system in-focus state detection part) that detects an in-focus state of the second optical system 320 is separately comprised. The second optical system focusing mechanism is controlled based on the detection result of the second optical system in-focus state detection part. The second optical system focusing mechanism is controlled by the camera micom 236. That is, the camera micom 236 functions as a second optical system focusing control part and controls the second optical system focusing mechanism based on the detection result of the second optical system in-focus state detection part.

A configuration of the second optical system in-focus state detection part is not particularly limited and can employ well-known detection mechanisms. For example, a detection mechanism based on a contrast method, a detection mechanism based on a phase difference method, and a detection mechanism using a distance sensor can be employed.

<Stop of Second Optical System>

In the embodiment, the stop (second optical system stop 320c) of the second optical system 320 is configured with a fixed stop. Alternatively, the stop of the second optical system 320 can be configured with a stop that can adjust the intensity of light. For example, the stop of the second optical system 320 can be configured with an iris stop.

<Configuration of Imaging Lens>

A configuration in which the first optical system 310 and the second optical system 320 are arranged in the concentric shape is used in the embodiment. However, the configuration of the imaging lens 300 is not limited to the embodiment. For example, a configuration in which the imaging lens 300 is divided in two equal parts in an up-down direction or the like can be used. In this case, the image sensor 210 is also configured to correspond to the configuration of the imaging lens 300.

In the embodiment, the first optical system 310 and the second optical system 320 are configured with optical systems having different focal lengths. Alternatively, the first optical system 310 and the second optical system 320 may be configured with optical systems that have the same focal length and different other properties. Alternatively, the first optical system 310 and the second optical system 320 may be configured with optical systems that have different focal lengths and different other properties. For example, the first optical system 310 and the second optical system 320 may be configured with optical systems having different transmitted wavelength characteristics. The "transmitted wavelength characteristic" refers to a property of allowing transmission of light having a specific wavelength range. The "optical systems having different transmitted wavelength characteristics" refer to optical systems that have different properties of allowing transmission of light having a specific wavelength range. For example, the imaging lens may be configured with an optical system allowing transmission of light having an infrared light range and an optical system allowing transmission of light in a visible light range.

<Crosstalk Removal Process>

In a case where images of two optical systems are captured by one image sensor like the camera of the present embodiment, crosstalk may occur. Crosstalk is a phenomenon in which light from another optical system is mixed and received. In a case where crosstalk occurs, an image on which an image of another optical system is superimposed is captured. In a case where crosstalk occurs, it is preferable to perform a crosstalk removal process on the image data acquired by imaging.

For example, the crosstalk removal process is performed as follows. For convenience of understanding, it is assumed that all first pixels have the same crosstalk ratio, and all second pixels have the same crosstalk ratio. The "crosstalk ratio" refers to the ratio of light received by each pixel from each optical system.

The crosstalk ratio of the first pixel is denoted by $C1=C11:C12$, and the crosstalk ratio of the second pixel is denoted by $C2=C21:C22$. The crosstalk ratio $C1$ of $C11:C12$ for the first pixel means that the ratio of light received from the first optical system and the second optical system is first optical system:second optical system=$C11:C12$. That is, light is received at a ratio of $C11$ from the first optical system and $C12$ from the second optical system. Similarly, the crosstalk ratio $C2$ of $C21:C22$ for the second pixel means that the ratio of light received from the first optical system and the second optical system is first optical system:second optical system=$C21:C22$.

The image data of the first optical system before the crosstalk removal process is referred to as first optical system primary image data, and the image data of the first optical system after the crosstalk removal process is referred to as first optical system secondary image data. The image data of the second optical system before the crosstalk removal process is referred to as second optical system primary image data, and the image data of the second optical system after the crosstalk removal process is referred to as second optical system secondary image data. In this case, crosstalk occurs at the crosstalk ratio $C1=C11:C12$ in the first optical system primary image data. In addition, crosstalk occurs at the crosstalk ratio $C2=C21:C22$ in the second optical system primary image data.

A pixel value (value of the pixel) of the first optical system primary image data and a pixel value of the second optical system primary image data at a specific pixel position (x, y) are denoted by A1 and A2. A pixel value of the first optical system secondary image data and a pixel value of the second optical system secondary image data at the corresponding pixel position are denoted by B1 and B2.

Each of the pixel values B1 and B2 of the first optical system secondary image data and the second optical system secondary image data is acquired by solving the following simultaneous equations.

$$A1=C11*B1+C12*B2$$

$$A2=C21*B1+C22*B2$$

That is, the first optical system primary image data is data that includes a component (the same meaning as a component of the first optical system) of the first optical system secondary image data and a component (the same meaning as a component of the second optical system) of the second optical system secondary image data at the ratio of $C11:C12$. Accordingly, in a case where this relationship is represented by an expression, $A1=C11*B1+C12*B2$ is established. Similarly, the second optical system primary image data is data that includes a component (the same meaning as a component of the first optical system) of the first optical system secondary image data and a component (the same meaning as a component of the second optical system) of the second optical system secondary image data at the ratio of $C21:C22$. In a case where this relationship is represented by an expression, $A2=C21*B1+C22*B2$ is established.

By solving the above simultaneous equations in units of pixels, each of the pixel values B1 and B2 of the first optical system secondary image data and the second optical system secondary image data can be calculated, and image data (the first optical system secondary image data and the second optical system secondary image data) in which the effect of crosstalk is removed can be generated.

The above simultaneous equations can be solved using a matrix. A matrix of two rows and one column including the pixel values A1 and A2 of the first optical system primary image data and the second optical system primary image data as elements is denoted by A. A matrix of two rows and one column including the pixel values B1 and B2 of the first optical system secondary image data and the second optical system secondary image data as elements is denoted by B. A matrix of two rows and two columns including the crosstalk ratio $C1=C11:C12$ of the first pixel and the crosstalk ratio $C2=C21:C22$ of the second pixel as elements is denoted by C. Then, the above simultaneous equations can be represented as $A=C*B$.

The pixel values B1 and B2 of the first optical system secondary image data and the second optical system secondary image data can be calculated by multiplying both sides of the matrix equation $A=C*B$ by an inverse matrix C−1 of C. That is, the pixel values B1 and B2 can be calculated by solving $B=C-1*A$.

The crosstalk ratio of each pixel is known. Thus, the inverse matrix C−1 can be acquired in advance. Accordingly, in a case where the pixel values A1 and A2 of each primary image data can be acquired, the pixel values B1 and B2 of each secondary image data can be calculated using the inverse matrix C−1.

As described thus far, by performing a predetermined calculation process (crosstalk removal process) on the primary image data, the secondary image data in which the effect of crosstalk is removed can be generated.

For example, this process can be configured to be performed by the camera micom 236. The camera micom 236 functions as a crosstalk removal processing part by executing the predetermined program. This process can also be performed by another apparatus such as the computer after imaging.

◆◆Other Embodiments of Imaging Apparatus◆◆

While a case of performing imaging by mounting the camera on the unmanned aerial vehicle is illustratively described in the embodiments, the configuration of the moving object on which the camera is mounted is not limited to the embodiments. Besides, for example, the configuration of the moving object can also be applied to a case of performing imaging by mounting the camera on the moving object such as an automatic driving car that automatically travels. The moving object may be either manned or unmanned. The flying object is not limited to an aerial vehicle and may be a flying object such as an artificial satellite or a spacecraft that flies in the outer space.

The camera may not necessarily be mounted on the moving object and can be configured such that a user performs imaging by holding the camera.

Furthermore, the present invention can be applied to a case of mounting the camera on a tripod head and performing imaging while panning.

◆◆First Embodiment of Image Composition Apparatus◆◆

[Apparatus Configuration of Image Composition Apparatus]

Figure 25:
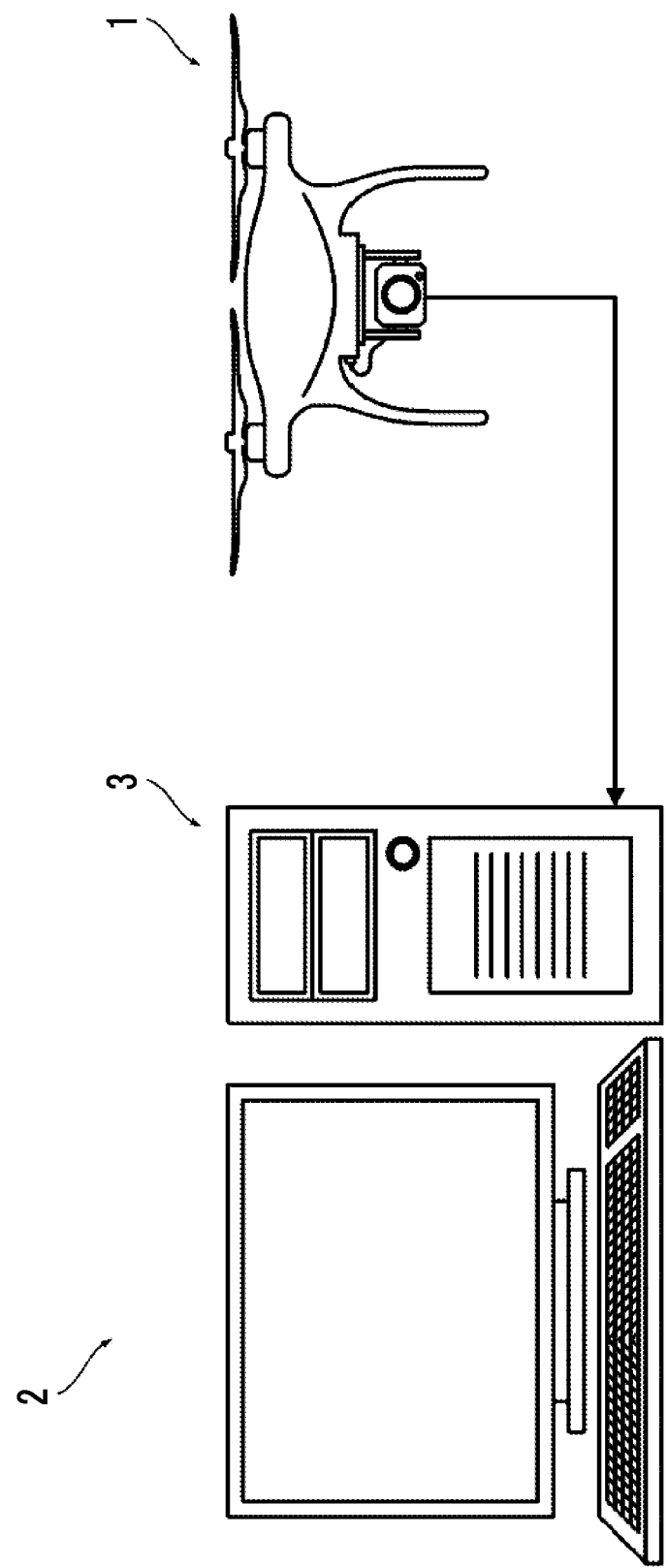
FIG. 25 is a system configuration diagram of an image composition apparatus.

FIG. 25 is a system configuration diagram of an image composition apparatus.

As illustrated in FIG. 25, an image composition apparatus 2 of the present embodiment is configured with the imaging apparatus 1 and a computer 3. The computer 3 generates a composite image by processing the image captured by the imaging apparatus 1. The generated composite image is a mosaic image in which the image group captured by the imaging apparatus 1 is linked.

<Imaging Apparatus>

In the present embodiment, the imaging apparatus 1 that comprises the single lens camera 100 is used.

It is assumed that the imaging apparatus 1 comprises the in-focus image extraction part. As described above, the in-focus image extraction part analyzes the motion image recorded in the recording part 124 in units of scanning and extracts the image of the frame having the highest sharpness as the in-focus image in units of scanning. The extracted in-focus image is recorded in the recording part 124. The camera micom 128 functions as the in-focus image extraction part by executing the predetermined program.

<Computer>

The computer 3 is one example of a composite image generation part. The computer 3 acquires the image group from the imaging apparatus 1 and generates one composite image by linking the acquired image group. The image group acquired from the imaging apparatus 1 is an in-focus image group extracted in units of scanning.

The computer 3 is configured with a general Neumann type computer and is configured to comprise an input apparatus, an output apparatus, a central processing unit (CPU), a main memory, an auxiliary memory, and the like. The computer 3 functions as the composite image generation part by executing a predetermined program. The program is stored in the auxiliary memory and is read into the main memory and executed by the central processing unit.

The computer 3 generates the composite image using well-known methods such as mosaic composition and stitching. For example, a method of extracting corresponding feature points between adjacent images and combining the corresponding feature points by registering the corresponding feature points can be employed.

[Effect of Image Composition Apparatus]

<Imaging>

First, a target for generating the composite image is imaged using the imaging apparatus 1.

Figure 26:
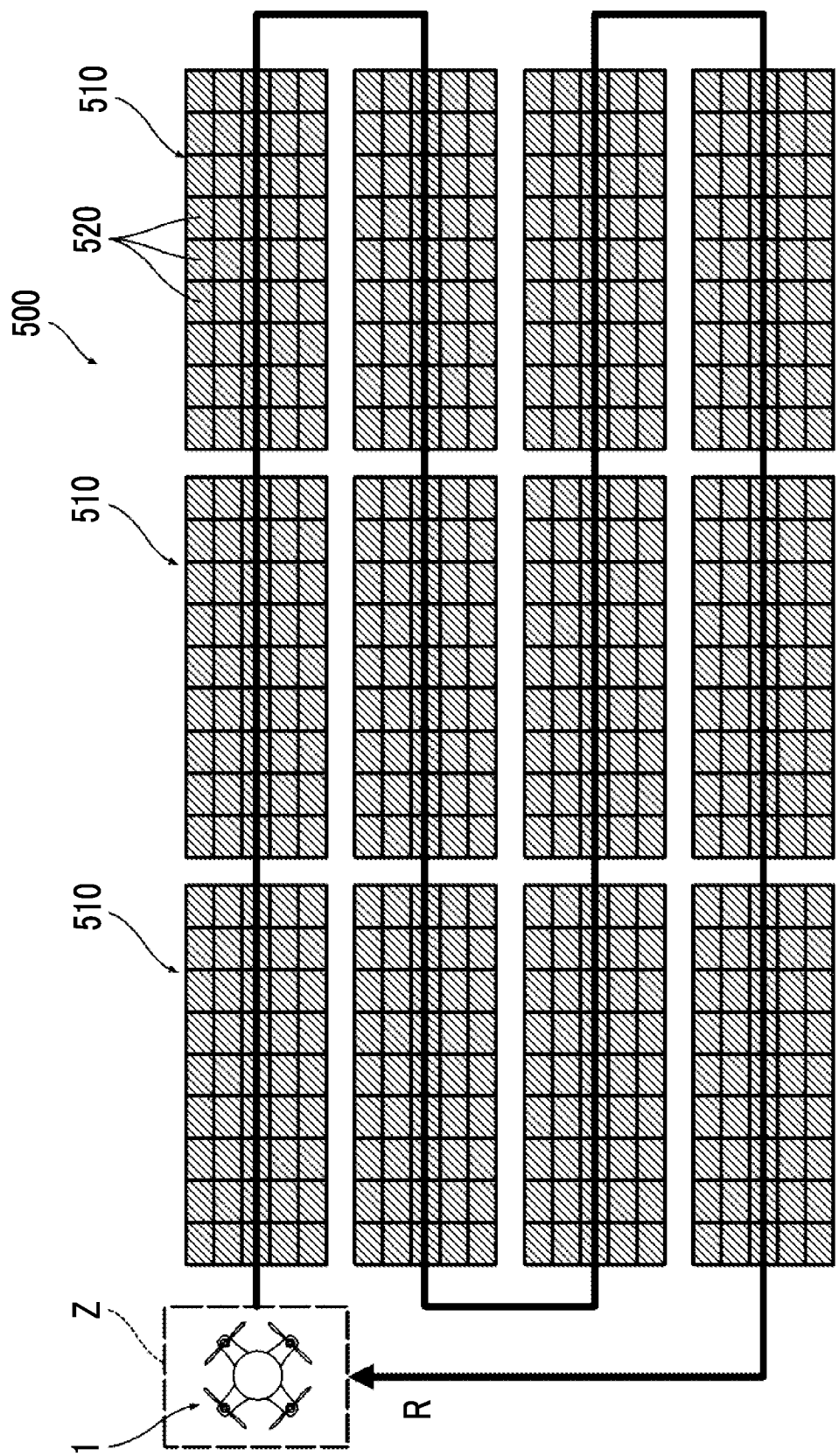
FIG. 26 is a diagram illustrating one example of a form of imaging.

FIG. 26 is a diagram illustrating one example of the form of imaging. FIG. 26 illustrates an example of a case of generating a composite image of a solar power generation facility 500. The solar power generation facility 500 installed on the ground is imaged from above by the imaging apparatus 1, and one composite image in which the whole solar power generation facility 500 is captured is generated.

The solar power generation facility 500 is configured by regularly arranging a plurality of solar power generation units 510. One solar power generation unit 510 is configured by regularly arranging a plurality of solar cell modules 520. In the example illustrated in FIG. 26, 45 solar cell modules 520 are arranged in vertically 5 rows and horizontally 9 columns and constitute one solar power generation unit 510. In addition, in the example illustrated in FIG. 26, the solar power generation facility 500 is configured by arranging 12 solar power generation units in vertically four rows and horizontally three columns.

An arrow R illustrated in FIG. 26 indicates a flight route of the imaging apparatus 1. A frame Z illustrated by a broken line in FIG. 26 indicates the imaging range in the case of performing imaging by the imaging apparatus 1 from a predetermined altitude.

As illustrated in FIG. 26, the imaging apparatus 1 flies such that the solar power generation facility 500 is scanned, and images the solar power generation facility 500 from above. As described above, the flight speed during imaging is set to the speed at which at least one scanning is performed during movement to the position shifted by the imaging range.

<Extraction of In-Focus Image>

During imaging or in a case where imaging is finished, the in-focus image extraction process is performed. The in-focus image extraction process is performed by analyzing the captured motion image in units of scanning and extracting the image of the frame having the highest sharpness in units of scanning. The extracted in-focus image is recorded in the recording part 124.

<Generation of Composite Image>

Figure 27:
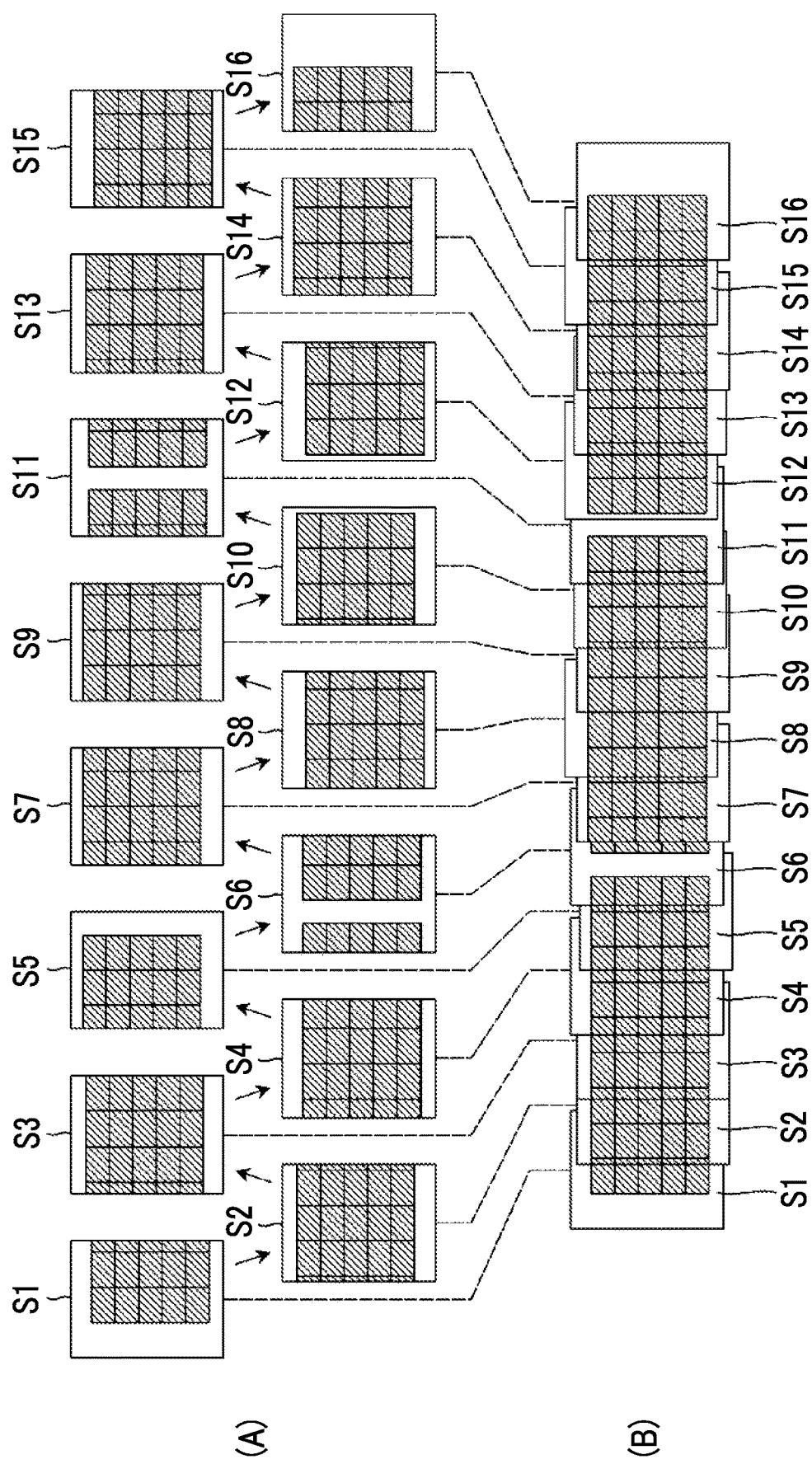
FIG. 27 is conceptual diagram of generation of a composite image.

FIG. 27 is conceptual diagram of generation of the composite image.

(A) of FIG. 27 illustrates one example of an in-focus image group acquired in a case where the imaging apparatus 1 almost linearly flies. Particularly, (A) of FIG. 27 illustrates one example of an in-focus image group acquired in the case of imaging one row of the solar power generation units 510 in the horizontal direction. (B) of FIG. 27 illustrates one example of a composite image generated from the in-focus image group in (A) of FIG. 27.

As illustrated in (A) of FIG. 27, in-focus images S1, S2, . . . are acquired in units of scanning in time series order by performing imaging using the imaging apparatus 1. In the acquired in-focus image group, individual images are images comprising an overlapping region between adjacent images. The adjacent images are adjacent images in time series order.

The computer 3 processes the in-focus image group using well-known methods and generates the composite image. For example, corresponding feature points between adjacent images are extracted, and the corresponding feature points are combined by registering the corresponding feature points. Accordingly, as illustrated in (B) of FIG. 27, one continuous composite image can be generated.

[Modification Example]

While a case of generating the composite image by processing the acquired in-focus image group using the imaging apparatus comprising the single lens camera 100 is illustratively described in the embodiment, the composite image can be generated using the imaging apparatus comprising the double lens camera 200. In this case, the composite image is generated by performing a composition process on the in-focus image group acquired from the first optical system 310. Since the first optical system 310 is a telephoto optical system, a high detail composite image can be generated. In addition, in this case, a feature point extraction process and the like can be performed using the image of the second optical system 320. The second optical system 320 is a wide angle optical system having a shorter focal length than the first optical system 310 and thus, can capture an image of a wider angle of view. In addition, the second optical system 320 can perform imaging on the same axis as the first optical system 310 and thus, can capture images in which only the angle of view is different. Accordingly, more feature points can be extracted, and processes such as registration can be accurately performed.

♦♦Second Embodiment of Image Composition Apparatus♦♦

An image composition apparatus of the present embodiment estimates a relative position and attitude of the camera in capturing of each in-focus image by analyzing the in-focus image group acquired by imaging, and generates the composite image by arranging each in-focus image based on the estimation result. Particularly, in the present embodiment, the relative position and attitude of the camera in a state where each in-focus image is captured are estimated using a structure from motion (SfM) method.

[Apparatus Configuration of Image Composition Apparatus]

A configuration of the image composition apparatus is the same as the configuration of the image composition apparatus 2 of the first embodiment. That is, the image composition apparatus is configured with the imaging apparatus 1 and the computer 3.

In the present embodiment, a case of using the imaging apparatus comprising the double lens camera 200 as the imaging apparatus 1 will be illustratively described. It is assumed that the imaging apparatus 1 comprises the in-focus image extraction part. The in-focus image extraction part analyzes the motion image captured by the first optical system 310 in units of scanning and extracts the image of the frame having the highest sharpness as the in-focus image of the first optical system 310. In addition, the in-focus image extraction part extracts an image of a frame corresponding to the in-focus image extracted in the first optical system 310 as the in-focus image of the second optical system 320.

<Computer>

Figure 28:
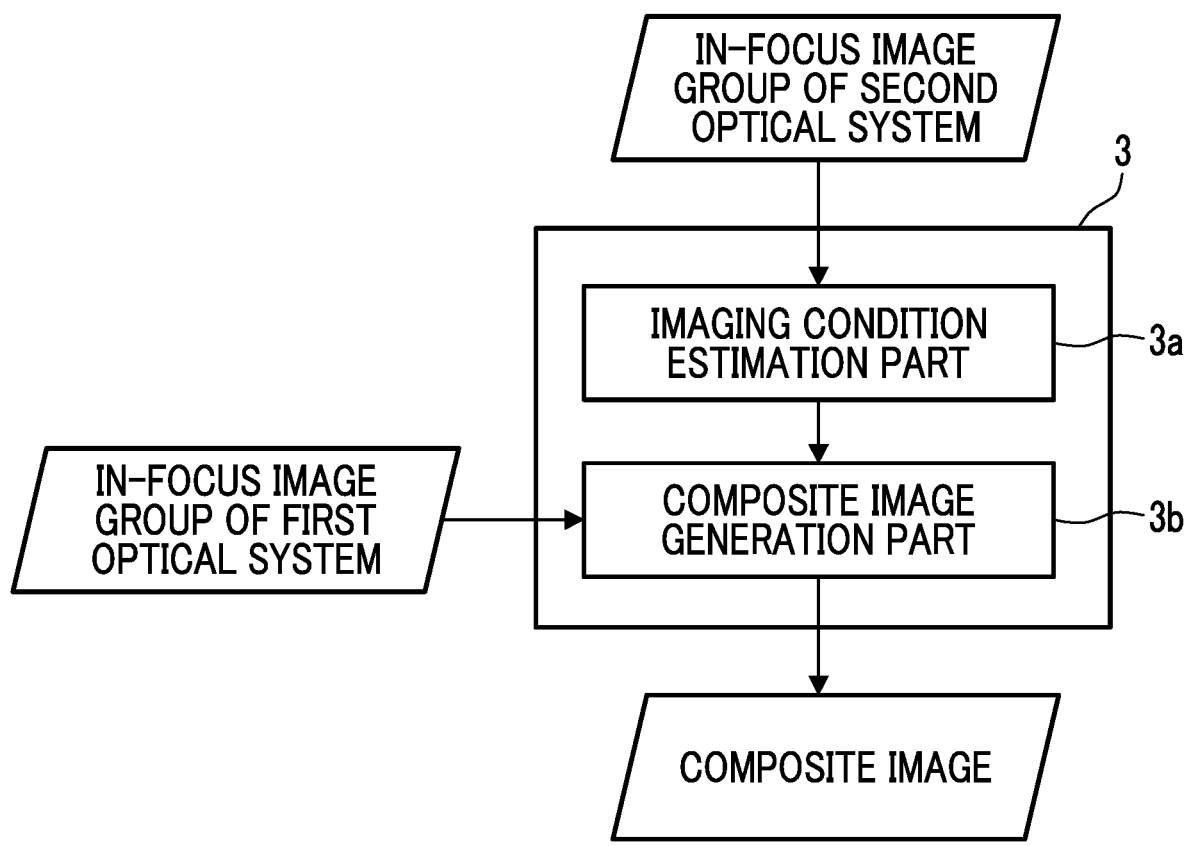
FIG. 28 is a block diagram of functions implemented by a computer.

FIG. 28 is a block diagram of functions implemented by the computer.

The computer 3 functions as an imaging condition estimation part 3a and a composite image generation part 3b by executing the predetermined program.

<Imaging Condition Estimation Part>

The imaging condition estimation part 3a acquires the in-focus image group acquired by imaging from the imaging apparatus 1 and estimates the relative position and attitude of the camera 200 in capturing of each in-focus image as an imaging condition by analyzing the acquired in-focus image group. In the present embodiment, the relative position and attitude of the camera 200 in capturing of each in-focus image are estimated by applying a SfM process to the acquired in-focus image group. The SfM process is a process of restoring a three-dimensional shape of the subject and the relative position and attitude of the camera from a plurality of images having different viewpoints. Programs such as "Bundler" and "VisualSFM" are known as a program performing the SfM process. In a case where an image group is input, these programs perform matching between images by extracting feature points in each image and estimate and output the 3D point coordinates of the feature points and the relative position and attitude of each camera.

Figure 29:
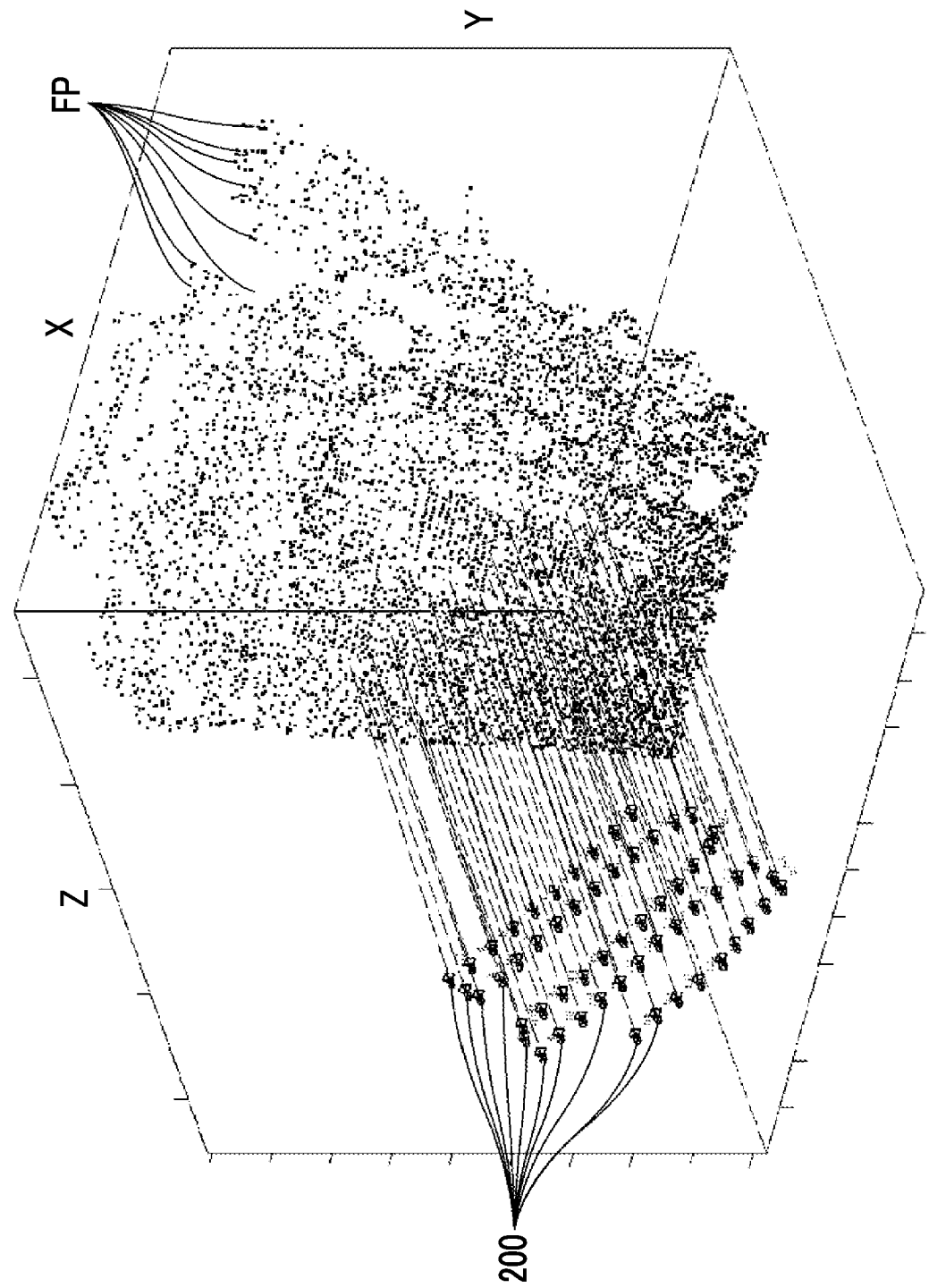
FIG. 29 is a diagram illustrating one example of a result output by a SfM process.

FIG. 29 is a diagram illustrating one example of the result output by the SfM process. In FIG. 29, a coordinate system X-Y-Z is a ground coordinate system of which a Z axis is the height direction. An X-Y plane represents the horizontal plane.

As illustrated in FIG. 29, by performing the SfM process on the image group, the 3D point coordinates of feature points FP extracted from each image and the relative position and attitude of the camera 200 are estimated.

As described above, in the image composition apparatus of the present embodiment, the imaging apparatus 1 comprising the double lens camera 200 is used. In the imaging apparatus 1, two images of different angles of view are captured at the same time on the same axis. Specifically, a telephoto image is captured by the first optical system 310, and a wide angle image is captured by the second optical system 320.

The imaging condition estimation part 3a estimates the relative position and attitude of the camera 200 in capturing of each in-focus image by performing the SfM process on the in-focus image group of the second optical system 320 of two in-focus image groups. The second optical system 320 is configured with a wide angle optical system and thus, can capture an image of a wider range. Accordingly, in the extraction of the feature points, a large number of feature points can be extracted, and the relative position and attitude of the camera 200 can be estimated with high accuracy.

<Composite Image Generation Part>

The composite image generation part 3b arranges each in-focus image and generates the composite image based on the estimation result of the imaging condition estimation part 3a. That is, based on the estimated relative position and attitude of the camera 200, a position and an attitude in which each in-focus image is arranged are specified, and the composite image is generated by arranging the in-focus images in the specified attitude at the specified position.

By specifying the relative position and attitude of the camera 200 in capturing of each in-focus image, the arrangement position and the arrangement attitude of each in-focus image on a plane on which each in-focus image is arranged can be specified. Accordingly, in a case where the images are arranged in the specified arrangement attitude at the specified arrangement position, a composite image of a wide range can be generated.

In the generation of the composite image, the in-focus image of the first optical system 310 is used. While the in-focus image of the second optical system 320 is used in the estimation of the position and the attitude of the camera 200, the image of the first optical system 310 is captured on the same axis as the second optical system 320. Thus, the same estimation result as the second optical system 320 can be used. The in-focus image of the first optical system 310 is a telephoto image. Thus, a higher detail composite image can be generated.

[Effect of Image Composition Apparatus]

<Imaging>

First, a target for generating the composite image is imaged using the imaging apparatus 1. Imaging is performed by controlling the flight speed as follows. That is, the flight speed is controlled such that the imaging apparatus 1 flies at a speed at which at least one scanning is performed during movement to the position shifted by the imaging range of the first optical system 310.

<Extraction of In-Focus Image>

During imaging or in a case where imaging is finished, the in-focus image extraction process is performed. For the motion image captured by the first optical system 310, the motion image is analyzed in units of scanning, and the image of the frame having the highest sharpness is extracted in units of scanning as the in-focus image. For the motion image of the second optical system 320, the image of the frame corresponding to the in-focus image of the first optical system 310 is extracted as the in-focus image.

<Generation of Composite Image>

As described above, first, the relative position and attitude of the camera 200 in capturing of each in-focus image are estimated by performing the SfM process on the in-focus image group of the second optical system 320. Next, based on the estimation result, the in-focus image of the first optical system 310 is arranged, and a composite image of a wide range is generated.

By performing the SfM process using the wide angle in-focus image group, the relative position and attitude of the camera 200 can be estimated with high accuracy. By generating the composite image using the telephoto in-focus image group, a higher detail composite image can be generated.

[Modification Example]

While a case of using the imaging apparatus comprising the double lens camera 200 is illustratively described in the embodiment, the imaging apparatus comprising the single lens camera 100 can also be used.

◆◆Other Embodiments◆◆

In the embodiment, functions implemented by the computer (including the microcomputer) can be implemented by various processors. The various processors include a CPU that is a general-purpose processor functioning as a processing unit performing various processes by executing a program, a programmable logic device (PLD) such as a field programmable gate array (FPGA) that is a processor of which a circuit configuration can be changed after manufacturing, a dedicated electric circuit such as an application specific integrated circuit (ASIC) that is a processor having a circuit configuration dedicatedly designed to execute a specific process, and the like.

One function may be implemented by two or more processors of the same type or different types. For example, a configuration in which one function is implemented by a plurality of FPGAs may be used, or a configuration in which one function is implemented by a combination of the CPU and the FPGA may be used.

A plurality of functions may be implemented by one processor. As an example of a configuration in which a plurality of functions are implemented by one processor, a first form is such that one processor is configured with a combination of one or more CPUs and software as represented by a computer such as a client and a server, and the processor implements a plurality of functions. A second form is such that a processor that implements a plurality of functions using one integrated circuit (IC) chip as represented by a system on chip (SoC) or the like is used. Various functions are implemented using one or more of the various processors as a hardware structure.

Furthermore, the hardware structure of the various processors is more specifically an electric circuit in which circuit elements such as a semiconductor element are combined.

EXPLANATION OF REFERENCES

1: imaging apparatus
2: image composition apparatus
3: computer
3a: imaging condition estimation part
3b: composite image generation part
10: unmanned aerial vehicle
12: controller
12a: controller operation part
12b: controller display part
12c: controller side wireless communication part
12d: controller micom
14: main body frame
14A: torso portion
14B: arm portion
14C: leg portion
16: propeller
20: propeller drive motor
22: motor driver
24: sensor part
26: vehicle side wireless communication part
28: vehicle side wired communication part
30: unmanned aerial vehicle micom
30a: movement control part
30b: camera control part
30c: vehicle side wireless communication control part
30d: vehicle side wired communication control part
100: camera
110: imaging lens
110f: focusing lens group
112: stop
114: stop motor
114a: stop motor driver
116: focusing motor
116a: focusing motor driver
118a: photointerrupter
118b: MR sensor
120: image sensor
120a: image sensor driver
122: analog signal processing part
124: recording part
126: camera side wired communication part
128: camera micom
128a: digital signal processing part
128b: recording control part
128c: camera side wired communication control part 128d: imaging control part
128e: stop control part
128f: focusing control part
128g: lens position detection part
200: camera
210: image sensor
210a: image sensor driver
212A: first pixel
212B: second pixel
214: photodiode
216: microlens
218: light blocking mask
230: analog signal processing part
232: recording part
234: camera side wired communication part
236: camera micom
236a: digital signal processing part
236b: recording control part
236c: camera side wired communication control part
236d: imaging control part
236e: first optical system stop control part
236f: first optical system focusing control part
236g: first optical system lens position detection part
300: imaging lens
310: first optical system
310a: first optical system first lens
310b: first optical system first mirror
310c: first optical system second mirror
310d: first optical system stop
320: second optical system
320a: second optical system first lens
320b: second optical system second lens
320c: second optical system stop
320d: second optical system third lens
320e: second optical system fourth lens
330: common lens
340: first optical system focusing motor
340a: first optical system focusing motor driver
342a: first optical system photointerrupter
342b: first optical system MR sensor
344: first optical system stop motor
344a: first optical system stop driver
500: solar power generation facility
510: solar power generation unit
520: solar cell module
FI: image of each frame in motion picture
FImax: image of frame having highest sharpness in motion picture
FP: feature point
Im1: image captured by first optical system
Im2: image captured by second optical system
L: optical axis
L1: light passing through first optical system
L2: light passing through second optical system
R: flight route of imaging apparatus
S1, S2, . . . : in-focus image
Z: frame indicating imaging range
θ: angle of view
θ1: angle of view of first optical system
θ2: angle of view of second optical system

What is claimed is:

1. An imaging apparatus comprising:
a moving object, comprising:
a processor configured to move the moving object at a speed at which at least one scanning is performed during movement to a position shifted by an imaging range; and
a camera, comprising:
an imaging lens;
a focusing mechanism, configured to move a part or all of lens groups constituting the imaging lens;
a memory; and
a camera processor,
wherein the camera processor configured to:
periodically scan a focus position for the at least one scanning within the imaging range by controlling the focusing mechanism;
cause the camera to continuously capture a motion image or periodically capture a still image
wherein the memory configured to:
record a motion image or a still image group captured by the camera.

2. The imaging apparatus according to claim 1,
wherein the processor is configured to move the moving object at a speed at which one scanning is completed at the same time as the movement to the position shifted by the imaging range.

3. The imaging apparatus according to claim 1,
wherein the processor is further configured to calculate the imaging range based on a subject distance and an angle of view of the camera.

4. The imaging apparatus according to claim 3,
wherein the camera processor is further configured to detect the subject distance based on an output of the camera.

5. The imaging apparatus according to claim 1,
wherein the camera comprises an image sensor that captures an image formed in the imaging lens, and
the focusing mechanism displaces the focus position by moving the part or all of the lens groups constituting the imaging lens.

6. The imaging apparatus according to claim 5,
wherein the imaging lens includes a first optical system and a second optical system that has the same optical axis as the first optical system and has a shorter focal length than the first optical system,
the image sensor has pixels that selectively receive light passing through the first optical system and light passing through the second optical system and are regularly arranged, and captures an image formed in the first optical system and an image formed in the second optical system at the same time,
the focusing mechanism includes a first optical system focusing mechanism that displaces a focus position of the first optical system by moving a part or all of lens groups constituting the first optical system,
the camera processor periodically scans the focus position of the first optical system by controlling the first optical system focusing mechanism,
the processor moves the moving object at a speed at which at least one scanning is performed during movement to a position shifted by an imaging range of the first optical system,
the camera processor causes the image sensor to continuously capture a motion image or periodically capture a still image, and
the memory records a motion image or a still image group captured by the first optical system and the motion image or the still image group captured by the second optical system.

7. The imaging apparatus according to claim 6,
wherein the second optical system is a fixed focal point optical system and performs pan-focus imaging.

8. The imaging apparatus according to claim 6,
wherein the camera processor is further configured to detect an in-focus state of the second optical system,
wherein the focusing mechanism further includes a second optical system focusing mechanism that displaces a focus position of the second optical system by moving a part or all of lens groups constituting the second optical system, and
the camera processor controls the second optical system focusing mechanism and causes the second optical system to focus on a subject based on a detection result.

9. The imaging apparatus according to claim 6,
wherein in the imaging lens, the first optical system and the second optical system are arranged in a concentric shape.

10. The imaging apparatus according to claim 6,
wherein the camera processor periodically scans the focus position of the first optical system by displacing the focus position of the first optical system in a sine wave shape.

11. The imaging apparatus according to claim 6,
wherein the camera processor periodically scans the focus position of the first optical system by displacing the focus position of the first optical system in a sawtooth wave shape.

12. The imaging apparatus according to claim 6,
wherein the camera processor is further configured to analyze the motion image or the still image captured by the first optical system in units of scanning and extracts an image of a frame having the highest sharpness or a still image having the highest sharpness as an in-focus image.

13. The imaging apparatus according to claim 1,
wherein the camera processor periodically scans the focus position by displacing the focus position in a sine wave shape.

14. The imaging apparatus according to claim 1,
wherein the camera processor periodically scans the focus position by displacing the focus position in a sawtooth wave shape.

15. The imaging apparatus according to claim 1,
wherein the camera processor is further configured to analyze the motion image or the still image group recorded in the memory in units of scanning and extracts an image of a frame having the highest sharpness or a still image having the highest sharpness as an in-focus image.

16. The imaging apparatus according to claim 1,
wherein the moving object is a flying object.

17. An image composition apparatus comprising:
the imaging apparatus according to claim 12; and
a computer configured to acquire a plurality of the in-focus images from the imaging apparatus and generates one composite image by linking the plurality of acquired in-focus images.

18. The image composition apparatus according to claim 17,
wherein the computer is configured to acquire an image of the second optical system corresponding to each of the in-focus images from the imaging apparatus and estimates, as an estimation result, a relative position and attitude of the camera in capturing of each of the in focus images by analyzing a plurality of the acquired images of the second optical system,
wherein the computer arranges each of the in-focus images and generates the composite image based on the estimation result.

19. The image composition apparatus according to claim 18,
wherein the computer applies a SfM process to the plurality of acquired images of the second optical system and estimates the relative position and attitude of the camera in capturing of each of the in-focus images.

* * * * *